United States Patent [19]

Domoto et al.

[11] Patent Number: 5,471,525
[45] Date of Patent: Nov. 28, 1995

[54] LINE STATUS DISPLAY SYSTEM FOR TELEPHONE EXCHANGE SYSTEM

[75] Inventors: Yoshihisa Domoto, Sukagawa; Toshie Takahashi, Nihonmatsu; Toshimi Kurumada, Koriyama, all of Japan

[73] Assignee: Hitachi Telecom Technologies, Ltd., Koriyama, Japan

[21] Appl. No.: 312,153

[22] Filed: Sep. 23, 1994

Related U.S. Application Data

[63] Continuation of Ser. No. 240,536, May 10, 1994, abandoned, which is a continuation of Ser. No. 842,189, Mar. 19, 1992, abandoned.

[30] Foreign Application Priority Data

Apr. 20, 1990 [JP] Japan .................................. 2-102977

[51] Int. Cl.$^6$ ............................ H04M 3/00; H04M 3/22; H04M 1/00
[52] U.S. Cl. ........................... 379/247; 379/34; 379/164; 379/267; 379/376; 379/384
[58] Field of Search ..................... 379/104, 122, 379/136, 164, 207, 218, 247, 263, 376, 377, 381, 383, 396, 34, 267, 384, 385

[56] References Cited

U.S. PATENT DOCUMENTS

| | | | |
|---|---|---|---|
| 4,638,124 | 1/1987 | Hargrave et al. | 379/164 X |
| 4,694,483 | 9/1987 | Cheung | 379/164 X |
| 4,790,004 | 12/1988 | Nalbone | 379/218 X |
| 4,873,717 | 10/1989 | Davidson et al. | 379/164 X |
| 4,907,259 | 3/1990 | Frech | 379/164 X |
| 5,046,086 | 9/1991 | Bergen et al. | 379/164 |

FOREIGN PATENT DOCUMENTS

| | | | |
|---|---|---|---|
| 62-281592 | 12/1987 | Japan . | |
| 63-185148 | 7/1988 | Japan . | |
| 63-185147 | 7/1988 | Japan . | |
| 63-177645 | 7/1988 | Japan . | |
| 0196154 | 8/1988 | Japan . | 379/207 |
| 1-293745 | 11/1989 | Japan . | |

*Primary Examiner*—Jeffery A. Hofsass
*Assistant Examiner*—Harry S. Hong
*Attorney, Agent, or Firm*—Foley & Lardner

[57] ABSTRACT

In a telephone exchange system accommodating a large number of communication lines, a line status display system is provided, which permits display of the status of a large number of lines in a limited display space of the terminal for scale reduction, is capable of flexible use with satisfactory operation control property and will not reduce the processing capacity of the exchange equipment. In a telephone exchange system comprising an exchange equipment (1) and a plurality of terminals (2, 2') accommodated therein, the exchange equipment (1) accommodating a plurality of lines, when detecting a line status change, sends out corresponding information to all the terminals (2, 2'), and the terminals check whether the line is a subject of processing, and if so, displays pertinent information in a predetermined display position.

9 Claims, 22 Drawing Sheets

FIG. 9

LINE TABLE

| LINE CODE | LINE KIND | GROUP NO | LINE NAME |
|---|---|---|---|
| CL 11 | CENTRAL OFFICE LINE | 1 | CO-11 |
| HL 11 | HOT LINE | 1 | ABCD-BK |
| SL 11 | BRANCH LINE | 1 | TOKYO-B |
| CL 21 | CENTRAL OFFICE LINE | 2 | CO-21 |
| CL 22 | CENTRAL OFFICE LINE | 2 | CO-22 |
| HL 21 | HOT LINE | 2 | EFGH-BK |
| HL 22 | HOT LINE | 2 | IJKL-BK |
| SL 21 | BRANCH LINE | 2 | OSAKA-B |
| SL 22 | BRANCH LINE | 2 | NAGOYA-B |
| CL 31 | CENTRAL OFFICE LINE | 3 | CO-31 |
| HL 31 | HOT LINE | 3 | MNOP-BK |
| SL 31 | BRANCH LINE | 3 | KYUSHU-B |
| ⋮ | ⋮ | ⋮ | ⋮ |
| CL n1 | CENTRAL OFFICE LINE | n | CO-n1 |

BUTTON TABLE

| BUTTON CODE | LINE CODE |
|---|---|
| K 1 | CL 21 |
| K 2 | HL 21 |
| K 3 | SL 21 |

10-1      10-2

FIG. 15-A
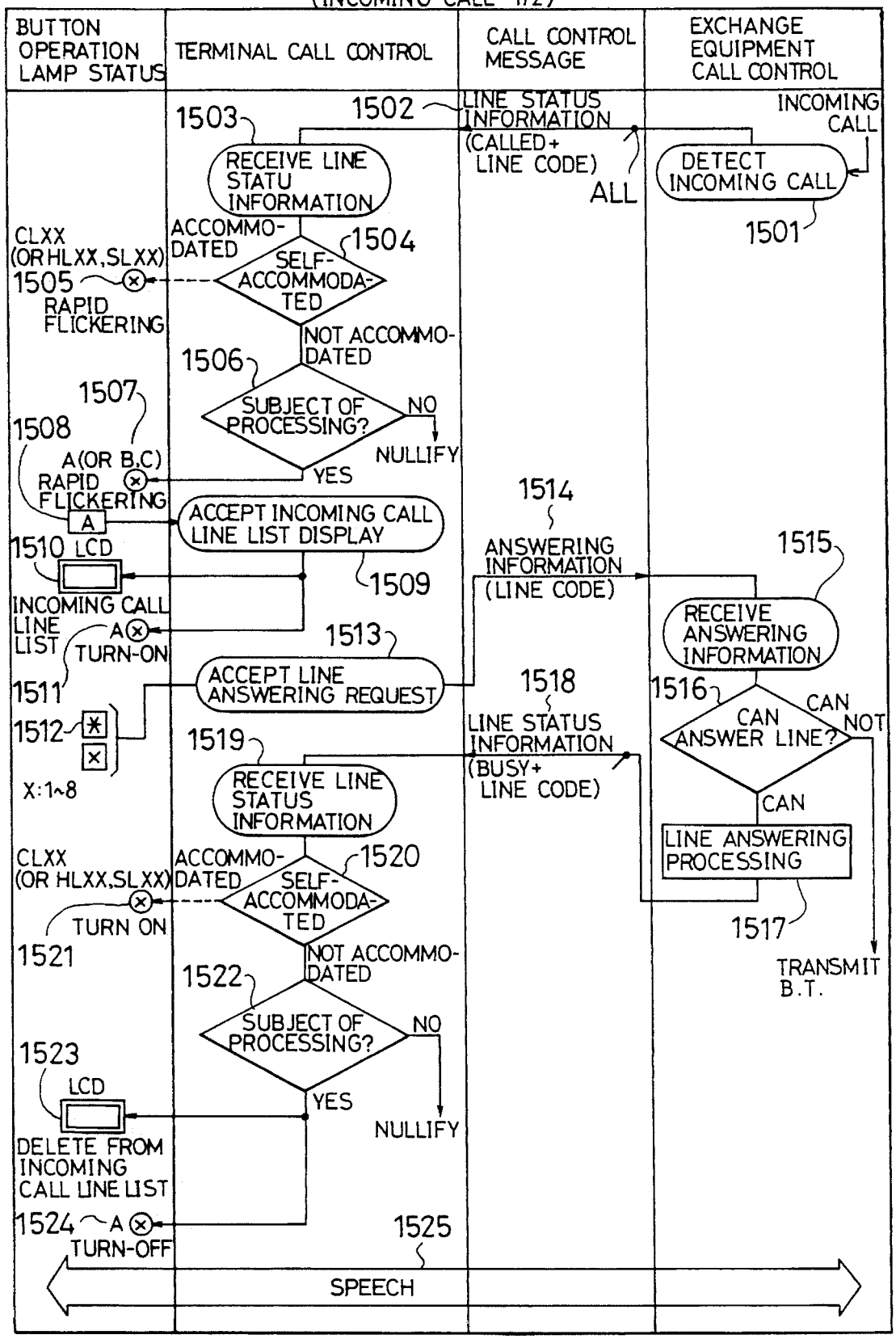

FIG. 15-B
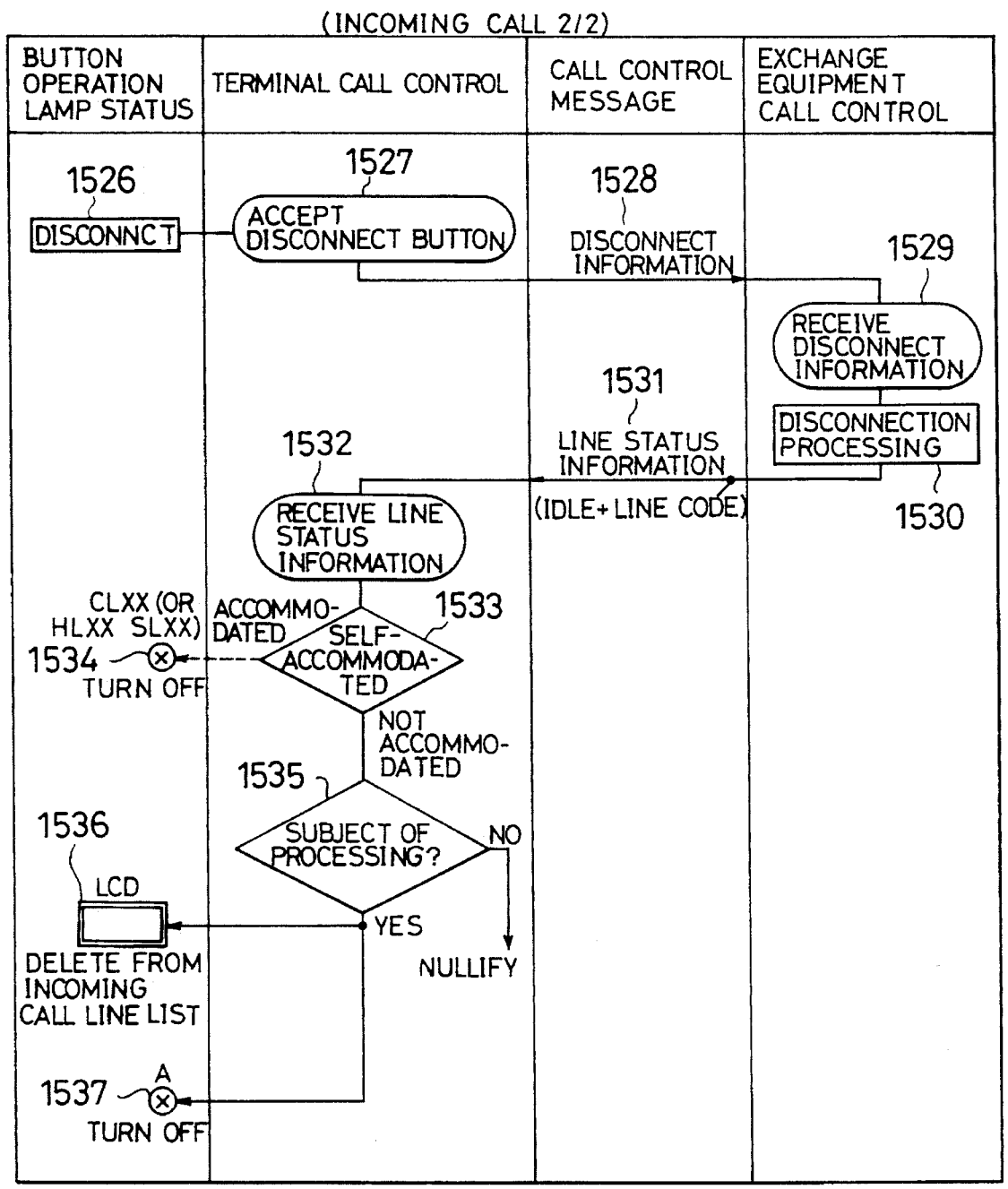

FIG. 16-A
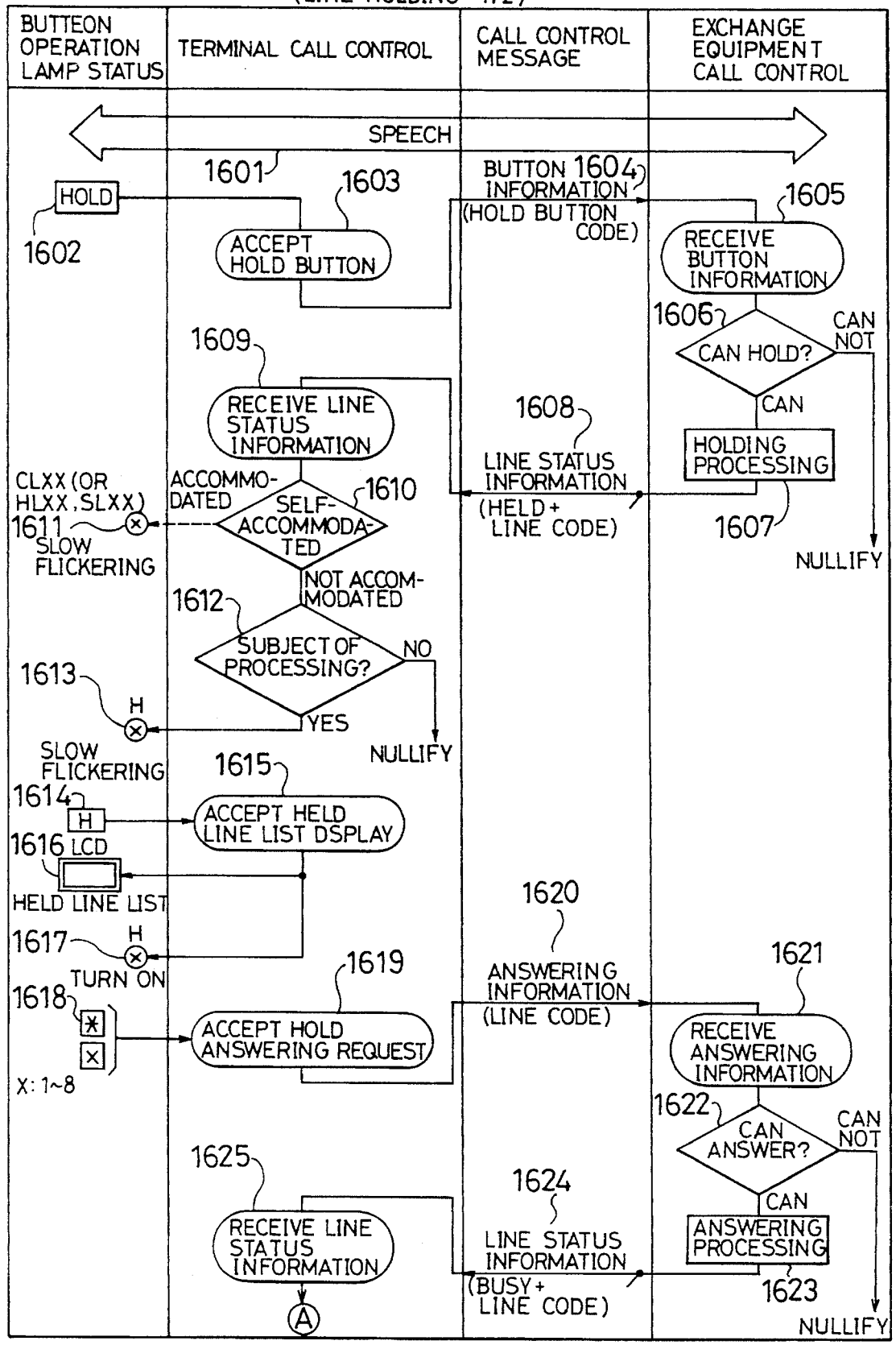

FIG. 16-B
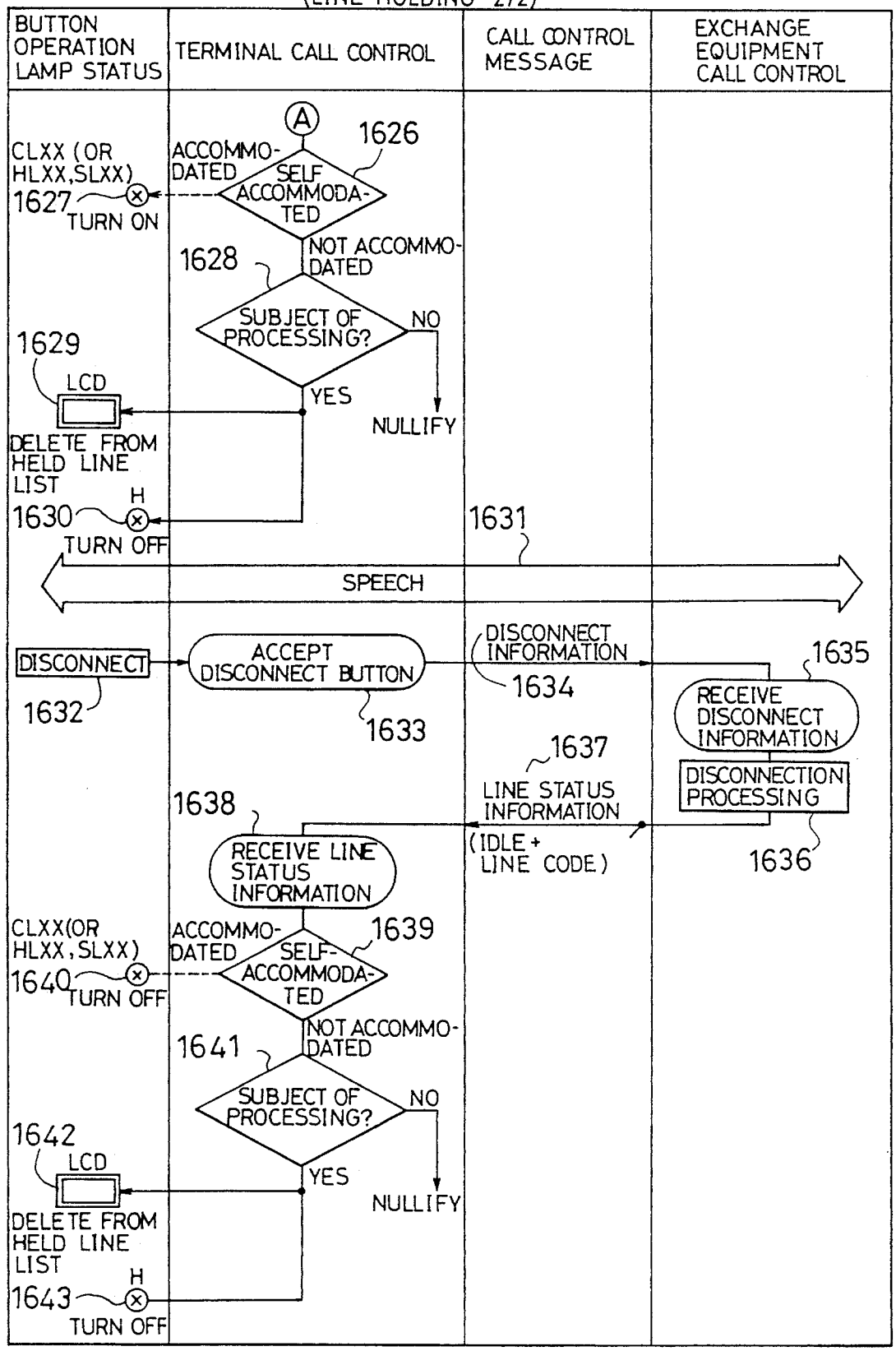

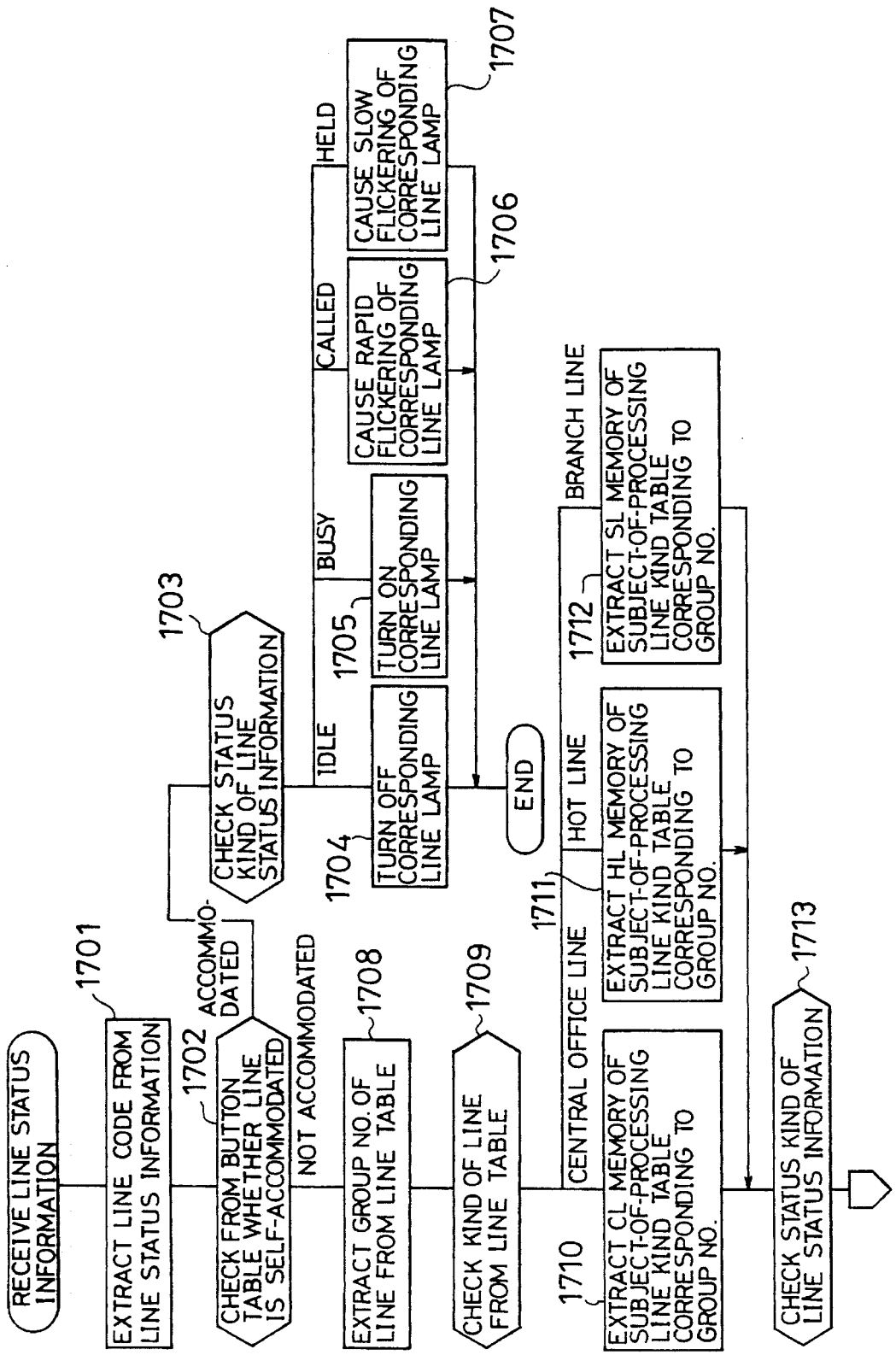
FIG. 17-A

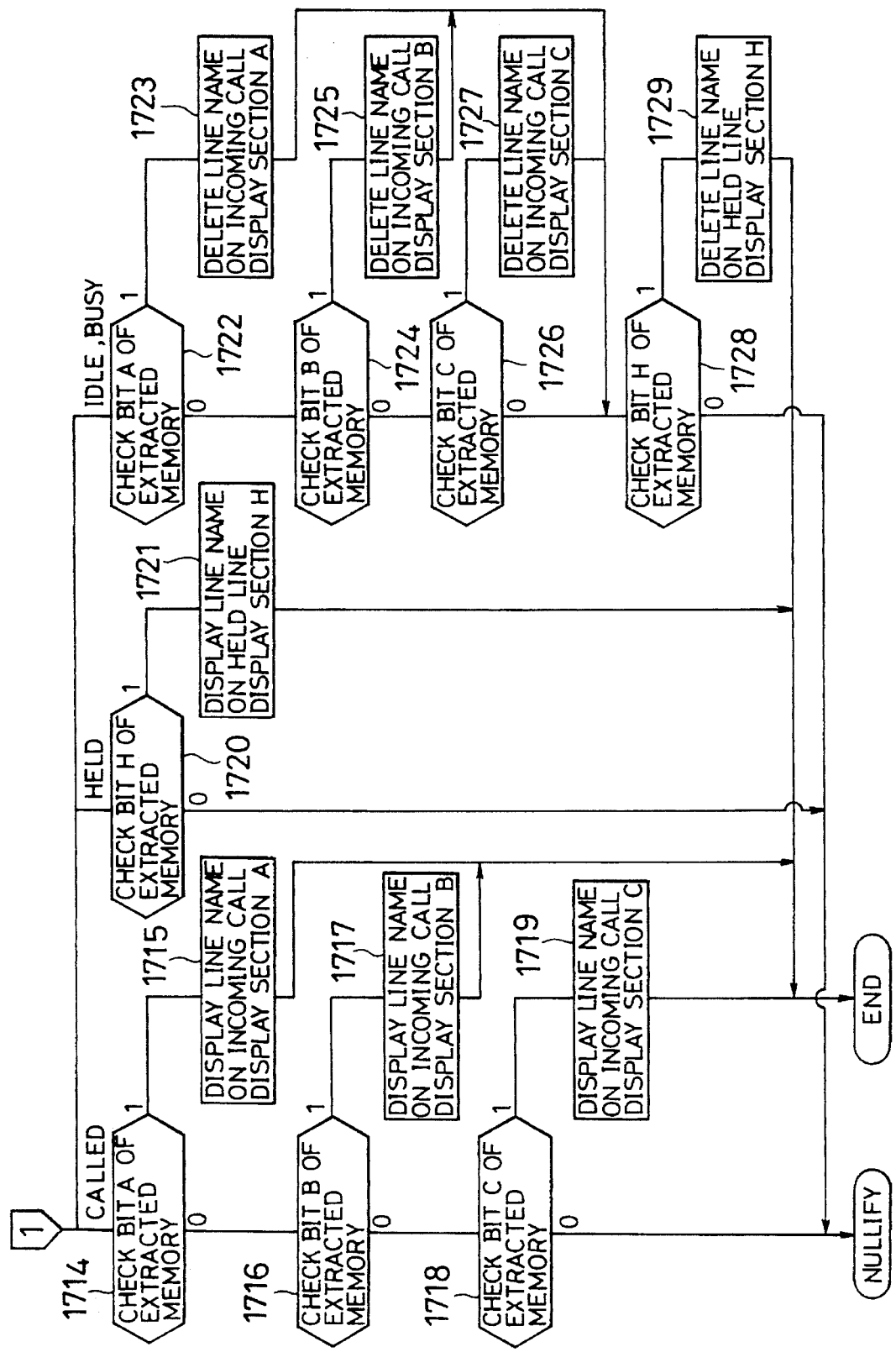

FIG. 20-A
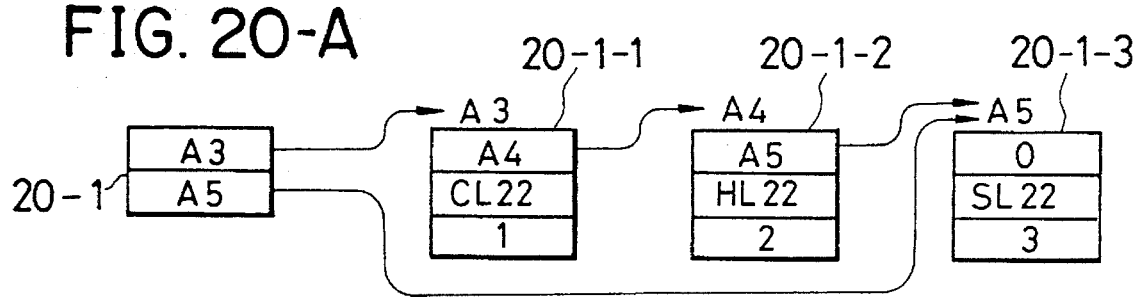
FIG. 20-B
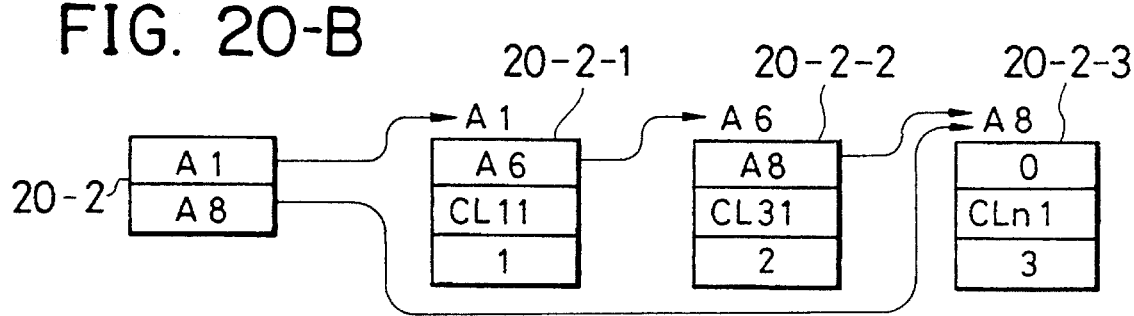
FIG. 20-C
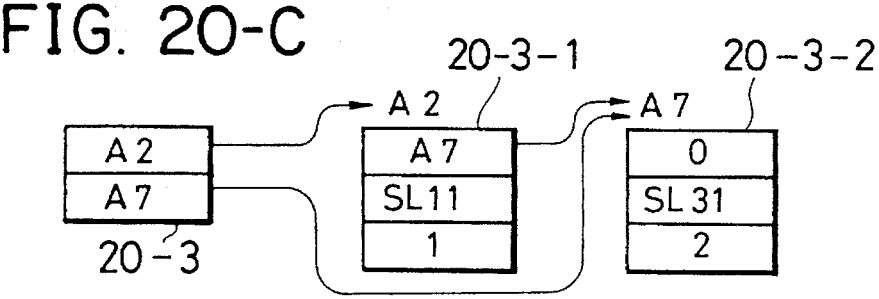
FIG. 20-D
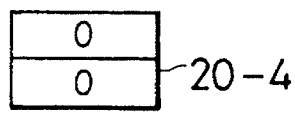

| INCOMING CALL LINE LIST A | INCOMING CALL LINE LIST B | INCOMING CALL LINE LIST C | HELD LINE LIST H |
|---|---|---|---|
| [1] COL NO.22 | [1] COL NO.11 | [1] TOKYO BRANCH | [1] |
| [2] IJKL BANK | [2] COL NO.31 | [2] KYUSHU BRANCH | [2] |
| [3] NAGOYA BRANCH | [3] COL NO.n1 | [3] | [3] |
| [4] | [4] | [4] | [4] |
| [5] | [5] | [5] | [5] |
| [6] | [6] | [6] | [6] |
| [7] | [7] | [7] | [7] |
| [8] | [8] | [8] | [8] |
| [9] | [9] | [9] | [9] |
| [10] | [10] | [10] | [10] |

LINE STATUS DISPLAY SYSTEM FOR TELEPHONE EXCHANGE SYSTEM

This application is a continuation of application Ser. No. 08/240,536, filed May 10, 1994, which is a continuation of Ser. No. 07/842,189, filed Mar. 19, 1992 (both now abandoned).

FIELD OF THE INVENTION

This invention relates to a line status display system for a telephone exchange system accommodating a large number of different kinds of lines classified in groups and, more particularly, to a line status display system for a telephone exchange system, which permits efficient display of the status of lines not accommodated in the local terminal.

Background Techniques

In a prior art line status display system for a telephone exchange system, buttons and lamps corresponding to respective lines are provided on a board of the terminal, and the line status such as "idle", "busy", "called" and "held" is displayed with a combination of the color of light and flickering frequency of the pertinent lamp. In this system, however, the buttons and lamps are increased in number in proportion to the number of lines, thus leading to increase of the size of the terminal.

Japanese Patent Publication H1-35,537 discloses a system which is intended to obviate this drawback. In this system, the telephone set is provided with a display, a button therefor and a paging button for renewing a display region of the display, and the lines are divided into pages each of several lines. The status of lines is displayed progressively on the same display by operating the paging button. The terminal scale increase is avoided in this way.

Banks or like financial institutions and also security companies use local telephone exchange systems (also called dealing speech systems), and lines accommodated in these systems are increasing in the number of their kinds and also their number. These lines are hot lines of brokers, banks, security companies, insurance companies, trading companies and other buisiness enterprises, local branch lines, toll branch lines and overseas branch lines, as well as central office lines. While numerous different lines are accommodated, a large number of terminals (hereinafter referred to as dealer boards) are connected to the exchange equipment of the dealing speech systems. Each dealer selects a line among the groups of lines by operating line buttons or the like on a dealer board operation panel for speech and execution of buisiness. Recently, the financial activity is increasing, and the financial market is also increasing in scale. To cope with the buisiness field of many dealers they are classified into various departments such as exchange department, bonds department, stocks demartment and so forth, and each department has some buisiness execution groups for respective districts or different customer buisiness categories. Where buisiness is executed in the individual groups as in the above, in each dealer terminal the lines in charge of a group are usually accommodated in the buttons and lamps on the board, and the lines in charge of the individual dealers are clearly distinguished from one another using different colors on name cards. A dealer normally handles his own lines, and handles lines in charge of other dealers only in case of emergency.

A problem encountered in this case is that it is necessary to accommodate the lines of other dealers which are normally scarcely used. This means that the terminal scale increase is inevitable even with adoptation of this system. In many cases, to accommodate the lines of other groups is substantially impossible due to limitations on the accommodation space.

Practically, in case of a large scale dealing speech system accommodating hundreds to thousands of lines, there is a strong demand for such operational flexibility as for handling, for instance, only specific kinds of lines in groups adjacent to the dealer's own group or central office lines in all groups in the same floor.

Further, if it is intended to merely apply the above method to a large scale dealing speech system, difficulties are encountered in the processing capacity of the exchange system and operation control property. Development of novel techniques, therefore, is strongly demanded.

As shown above, the prior art line status display system for a telephone exchange system has a drawback that its scale increase is inevitable if a large number of lines are accommodated in the terminal. Moreover, since the exchange system is in charge of a large proportion of the display processing, its processing capacity is extremely reduced if it is designed to be able to cope with a versatility of operating conditions such as different line category constitutions or group constitutions.

An object of the present invention is to provide a line status display system for a telephone exchange system, which permits display of the status of a large number of lines in a limited display space of the terminal, thus permitting scale reduction to be realized, as well as having satisfactory operation control property, permitting flexible operation and being free from reduction of the processing capacity of the exchange equipment.

Disclosure of the Invention

According to the invention, in a telephone exchange system comprising exchange equipment accommodating a plurality of lines and a plurality of terminals accommodated in the exchange equipment, the exchange equipment sends out, upon detection of a line status change, line status information indicative of that line status change to all the terminals, and the terminals receiving the line status information each Judges whether the pertinent line is a subject of processing and, if so, displays the changed line status in a predetermined display position.

In the terminal, table registration has been made for determining whether a line in question is a subject of processing from the kind and group number of the line and also determining the display position or display region. When the exchange equipment detects a line status change, it notifies all the terminals of line status information without selecting any particular terminal for notification. Each terminal checks the received line status information with reference to the above-tables, and if the line is a subject of processing, it displays a line status in a predetermined display region.

With the above operation, only lines of necessary kinds in necessary groups among line status changes taking place in the exchange equipment are displayed in individual display regions. Thus, the operator of the terminal can efficiently select a given line.

Thus, according to the invention the status of a large number of lines can be displayed in a limited display space, and the central controller of the exchange equipment need not select any terminal for notification of status but may merely transmit the same information to all the terminals. Thus, only lines of necessary kinds in necessary groups can be handled for status display without reducing of processing capacity, thus permitting efficient line selection.

BRIEF DESCRIPTION OF THE DRAWINGS

FIG. 9 is a view showing a line table possessed by the terminal; FIG. 10 is showing a button table possessed by the terminal; FIGS. 15-A and 15-B show a call control sequence when-an incoming call is placed; FIGS. 16-A and 16-B show a call control sequence when a line is held; FIGS. 17-A and 17-B are call control flow charts when the terminal receives line status information; FIG. 20 is a view showing a manner of connection of the display processing transaction to each line list cue when each line is with an incoming call as shown in FIG. 1, with (A) showing an incoming call line list cue pointer corresponding to button A shown in FIG. 3, with (B) showing an incoming call line list cue pointer corresponding to button B, with (C) showing an incoming call line list cue pointer corresponding to button C, and with (D) showing an incoming call line list cue pointer corresponding to button H; FIG. 23 is a view showing a display using a CRT.

DESCRIPTION OF SYMBOLS

1 ... exchange equipment, 1-1 ... speech channel switch, 1-2 ... trunk, 1-3 ... exclusive line circuit; 1-4 ... central controller, 1-5 ... memory, 1-6 ... control system bus, 2,2' ... terminal (i.e., dealing speech terminal), 2-6 ... liquid crystal display, 2-6' ... plasma display with touch sensor

BEST FORM OF CARRYING OUT THE INVENTION

The invention will now be described in greater detail with reference to the accompanying drawings.

SUMMARY OF THE SYSTEM CONFIGURATION

Figure 2:
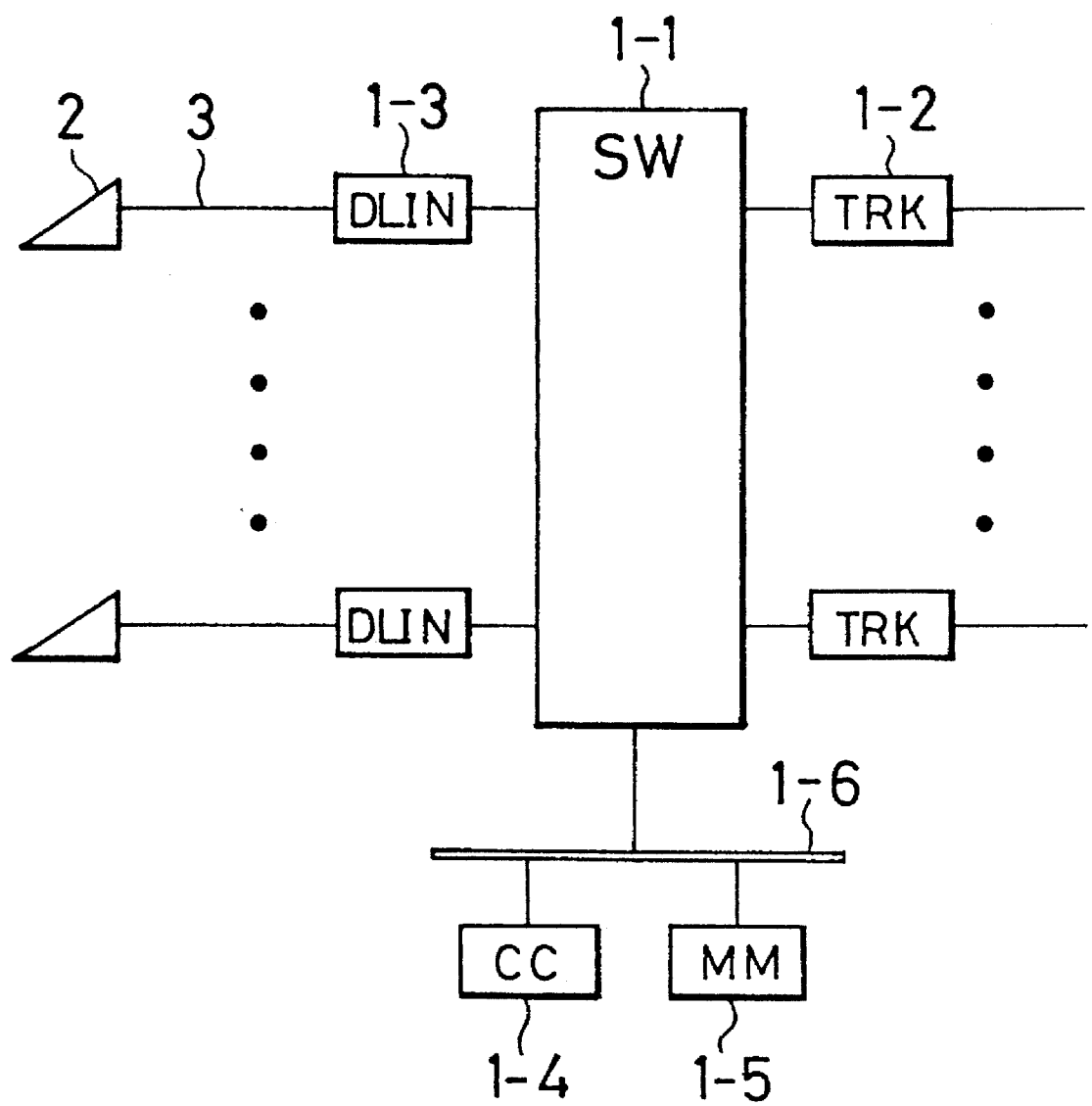
FIG. 2 is a view showing the construction of the telephone exchange system.

FIG. 2 is a view showing an example of the configuration of the telephone exchange system according to the invention. Referring to FIG. 2, the telephone exchange system has a speech channel switch (SW) 1-1. To the speech channel switch 1-1 are connected exclusive line circuits (DLIN) 1-3, which accommodate and control connection of terminals 2 such as dealer boards. The terminals 2 and exclusive line circuits 1-3 are coupled to one another by connection cables 3 for transmission and reception of voice signals and call control signal between them. To the speech channel switch 1-1 is connected a trunk (TRK) 1-2, which accommodates and controls connnection of central office lines, hot lines and branch lines.

The central controller (CC) 1-4 controls the entire telephone exchange system and effects call control between terminals 2 and also between terminals 2 and central office lines hot lines or branch lines. The memory (MM) 1-5 stores programs, office data and various tables used by the central controller 1-4 for the control of the entire telephone exchange system, and it is connected through the control system bus 1-6 to the central controller 1-4. The speech channel switch 1-1 is connected to the control system bus 1-6 and although not shown the central controller (CC) 1-4 is logically connected to exclusive line circuits 1-3 and trunks 1-2. Thus, the speech channel switch 1-1, exclusive line circuits 1-3 and trunks 1-2 are operable under control of the central controller 1-4.

Hardware Construction

Construction of the terminal (first example)

Figure 3:
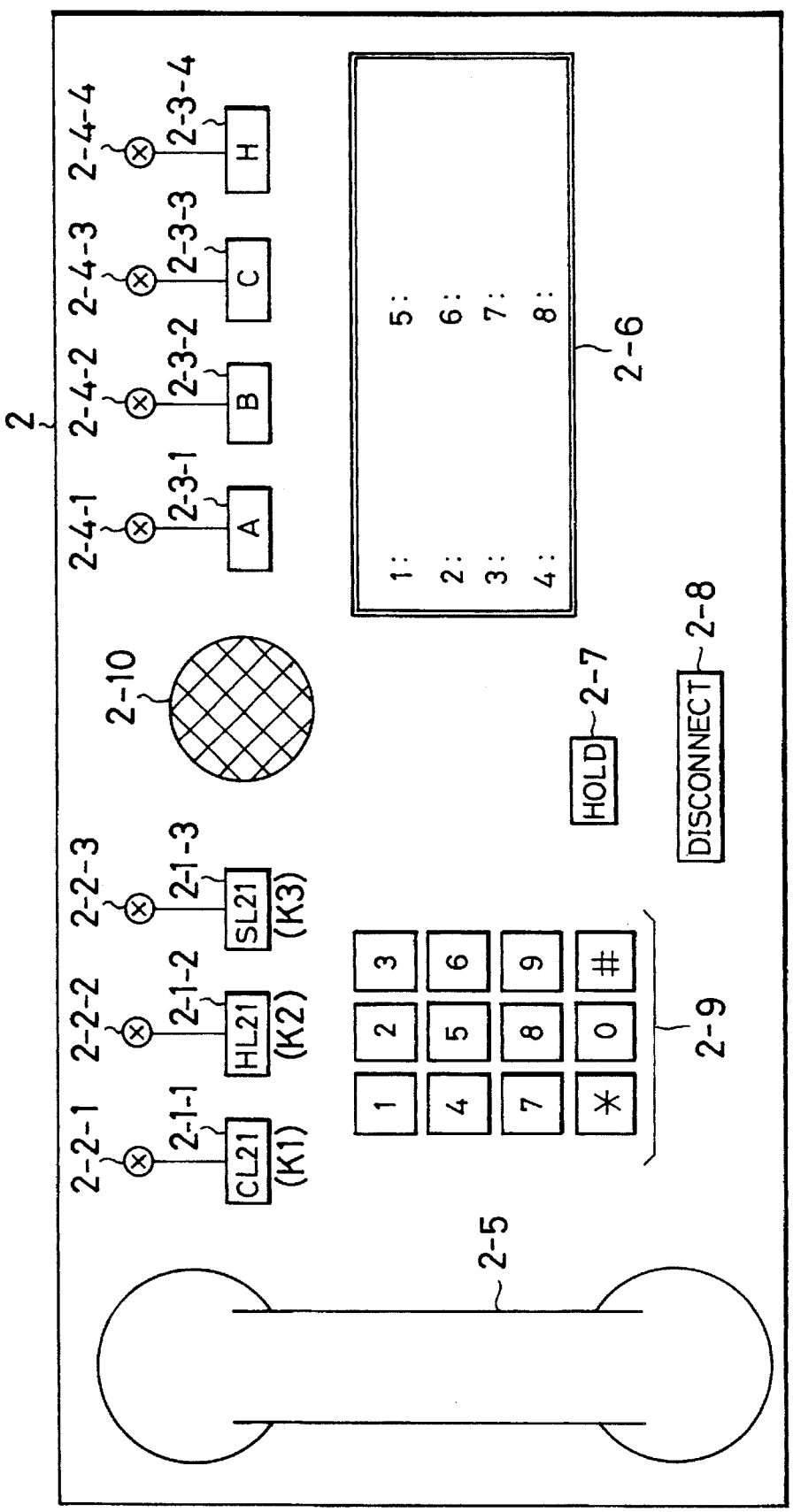
FIG. 3 is a view showing the board design of the terminal (i.e., dealing speech terminal)

Now, a first example of the construction of the terminal will be described. FIG. 3 shows a board of terminal 2 as a first construction example, and FIG. 4 is a functional block diagram of the same.

Referring to FIG. 3, the terminal 2 includes, in addition to a speech handset 2-5, a button "CL21" 2-1-1 corresponding to a self-accommodated central office line CL21 a lamp 2-2-1 (also referred to as lamp CL21) corresponding to the button "CL21" 2-1-1, a button "HL21" 2-1-2 corresponding to a self-accommodated hot line HL21 a lamp 2-2-2 (also referred to as lamp HL21) corresponding to the button "HL21" 2-1-2, a button "SL21" 2-1-3 corresponding to a self-accommodated branch line SL21, a lamp 2-2-3 (also referred to as lamp SL21) corresponding to the button "SL21" 2-1-3, a liquid crystal display (LCD) 2-6 for displaying names of lines which are not self-accommodated but are capable of answering calls, a button "A" 2-3-1for causing display of a incoming call line list A on the liquid crystal display 2-6, a lamp 2-4-1 (also referred to as lamp A) corresponding to the button "A" 2-3-1 and for displaying the incoming call status to the incominig call line list A, a button "B" 2-3-2 for displaying an incoming call line list B, a lamp 2-4-2 (also referred to as lamp B) corresponding to the button "B" 2-3-2 and for displaying the incoming call status to the incoming call line list B, a button "C" 2-8-3 for displaying an incoming call line list C, a lamp 2-4-3 (also referred to as lamp C) corresponding to the button "C" 2-3-3 and for displaying the incoming call status to the incoming call line list C, a button "H" 2-3-4 for displaying a held line list H, a lamp 2-4-4 (also referred to as lamp H) corresponding to the button "H" 2-3-4 and for displaying the holding status to held line list H, a dial key set 2-9 for dialing, a button "hold" 2-7 for holding speech, a button "disconnect" 2-8 for disconnecting speech, and an incoming call ringer 2-10 for causing audible notice of an incoming call. The self-accommodated lines belong to a specific group, the not self-accommodated lines belong to at least one other group. The buttons "CL21" 2-1-1, "HL21" 2-1-2 and "SL21" 2-1-3 are "first answering means," the buttons "A" 2-3-1, "B" 2-3-2, and "C" 2-3-3 are "group selection means".

Figure 4:
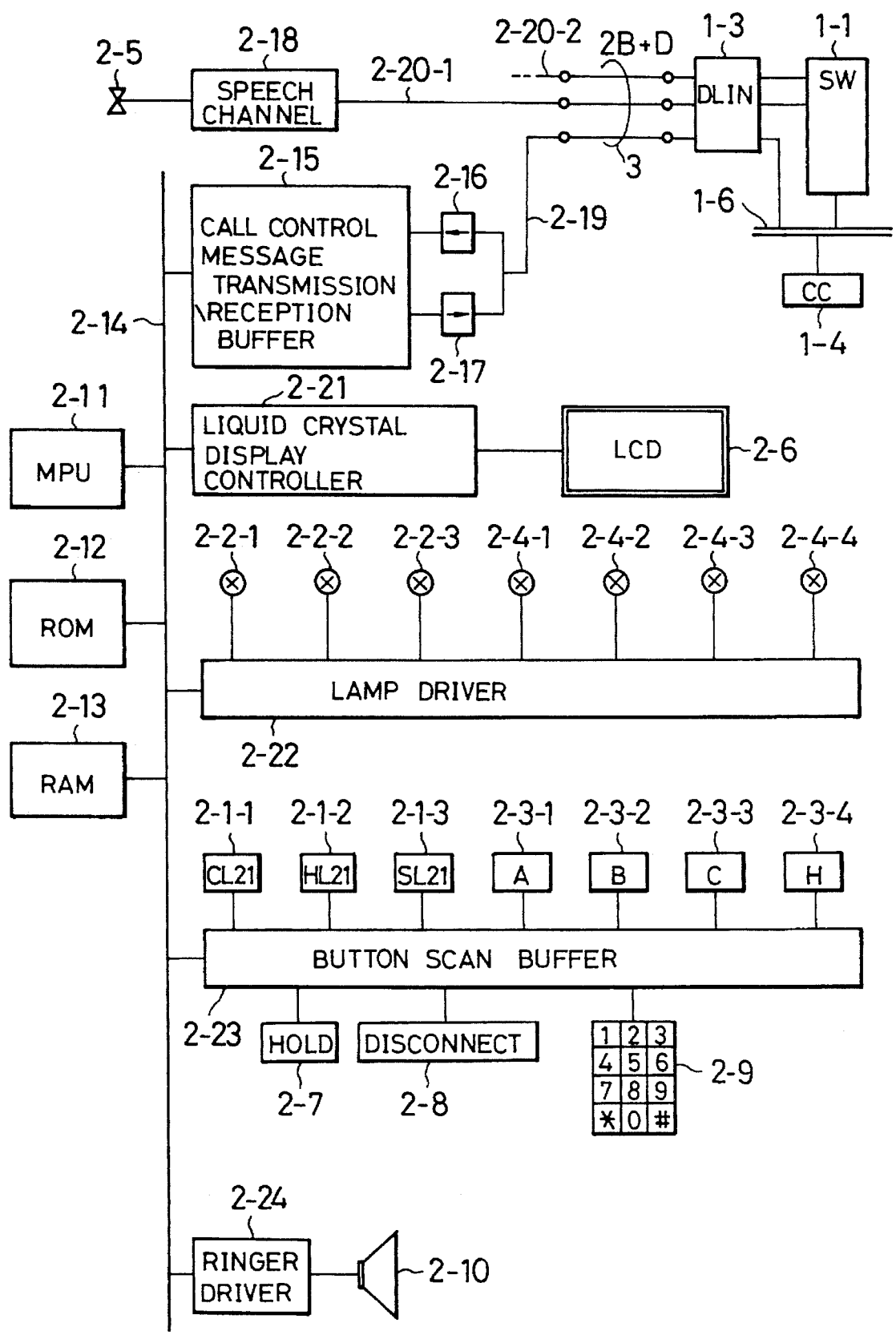
FIG. 4 is a functional block diagram showing the hardware construction of the terminal (i.e., dealing speech terminal)

FIG. 4 is a functional block diagram showing the hardware structure of terminal 2, which is the structure of the board shown in FIG. 3. Referring to FIG. 4, the terminal 2 has a call control processor (MPU) 2-11 which controls the entire terminal and is connected to a control bus 2-14. The call control processor 2-11 executes control according to programs stored in a permanent memory (ROM) 2-12 connected to the control bus 2-14. A temporary memory (RAM) 2-13 is connected to the control bus 2-14 and stores various variable data, for instance tables different for individual offices or transient information produced during execution of control by the call control processor 2-11. Thus, the call control processor 2-11, like other processor systems, executes processing progressively by accessing the permanent memory 2-12 and temporary memory 2-13, thus controlling the entire terminal 2.

A call control message transmission/reception buffer 2-15, a liquid crystal display controller 2-21, a lamp driver 2-22, a button scan buffer 2-23 and a ringer driver 2-24 are connected to the control bus 2-14 and are all operable under control of the call control processor 2-11.

The call control message transmission/reception buffer 2-15 transmits and receives call control messages with respect to the exchange equipment 1, and to this buffer are connected a receiving circuit 2-16, which receives call control messages from the exchange equipment 1 via an ISDN basic rate interface signal channel (D channel) 2-19, and a transmitting circuit 2-17, which transmits call control messages to the exchange equipment 1 via the D channel 2-19.

The liquid crystal display (LCD) 2-6 is connected to the liquid crystal display controller 2-21, and line names are displayed on the liquid crystal display 2-6 under control of the call control processor 2-11.

The lamps 2-2-1, 2-2-2, 2-2-3, 2-4-1, 2-4-2, 2-4-3 and 2-4-4 are connected to the lamp driver 2-22, and their flickering is controlled such as to display the status of their corresponding buttons.

The button scan buffer 2-23 scans the buttons "CL21" 2-1-1, "HL21" 2-1-2, "SL21" 2-1-3, "A" 2-3-1, "B" 2-3-2, "C" 2-3-3, "H" 2-3-4, "hold" 2-7 and "disconnect" 2-8 and dial key set 2-9 connected to it for their "on" or "off" status detection.

The ringer driver 2-24 controls an incoming call ringer 2-10 for audible indication of incoming calls.

The speech handset 2-5 is connected through a speech circuit 2-18 to one of two voice or data channels (or B channels) B1 and B2, i.e., B channel 2-20-1, of the ISDN basic rate interface, and it is also connected via a exclusive line circuit (DLIN) 1-3 of the exchange equipment 1 to the speech channel switch (SW) 1-1. The other B channel 2-20-2 is used for other voice or data purposes, but it is not described particularly in this embodiment.

Actually, the two B channels 2-20-1 and 2-20-2 and D channel 2-19 are time-division multiplexed for digital communication. In the instant description, however, space division is assumed for the sake of simplification. Therefore, time-division multiplexing and demultiplexing circuits for the two B channels and D channel are not shown in FIG. 4.

Construction of the exchange equipment

The construction of the exchange equipment 1 is as described above. Here, the exclusive line circuit (DLIN) 1-3 will be described, which is provided for transmisson and reception of call control information (or call control message) with respect to the terminal 2.

In an embodiment, the exclusive line circuit 1-3 comprises hardware for permitting connection of the terminal 2 and exchange equipment I to each other with a digital interface (i.e., ISDN basic rate interface with channels B1, B2 and D), and it will be described hereinunder in detail with reference to FIG. 5.

Figure 5:
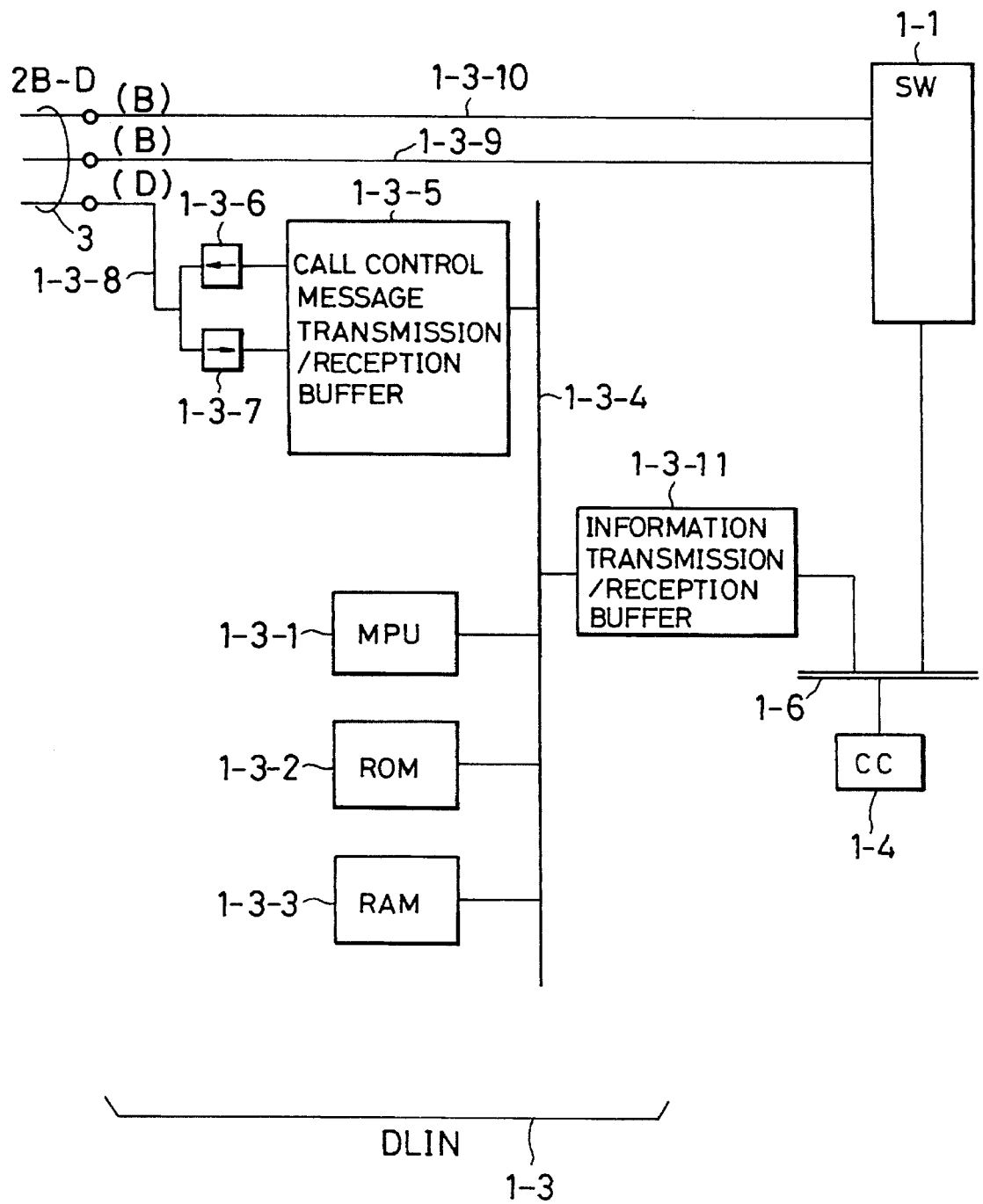
FIG. 5 is a functional block diagram showing the hardware structure of an exclusive line circuit (DLIN) in the exchange equipment.

Referring to FIG. 5, the exclusive line circuit 1-3 has a processor (MPU) 1-3-1 for controlling the entire exclusive line circuit, and it transmits and receives control information with respect to the central controller 1-4 in the exchange equipment 1 and also transmits and receives call control messages with respect to the terminal 2. The control procedures or methods of processing to be executed by the processor 1-3-1 are preliminarily programmed in the permanent memory(ROM) 1-3-2, and the processing is executed according to the program while storing transient information or data in the temporary memory (RAM) 1-3-3. Further, a call control message transmission/reception buffer 1-3-5 is provided for transmitting and receiving call control messages with respect to the terminal 2, and a transmitting circuit 1-3-6 and a receiving circuit 1-3-7 are connected to the call control message transmission/reception buffer 1-3-5. The transmitting circuit 1-3-6 transmits call control messages to the terminal 2 via the D channel 1-3-8 of the ISDN basic rate interface i.e. an interface for connection to the terminal 2, and the receiving circuit 1-3-7 receives call control messages from the terminal 2 via the D channel 1-3-8. Further, an information transmission/reception buffer 1-3-11 is provided for transmitting and receiving information with respect to the central controller 1-4 of the exchange equipment 1. The information transmission/reception buffer 1-3-11 is connected to the control system bus 1-6 of the exchange equipment. Further, the processor 1-3-1, permanent memory 1-3-2, temporary memory 1-3-3, call control message transmission/reception buffer 1-3-5 and information transmission/reception buffer 1-3-11 are connected to the control bus 1-3-4 for transmission and reception of various kinds of information.

With this construction, the transmission and reception of control information between the processor 1-3-1 and central controller 1-4 are executed via the control bus 1-3-4 and information transmission/reception buffer 1-3-11. In addition, the transmission and reception of call control messages between the processor 1-3-1 and terminal 2 are executed via the control bus 1-3-4 and call control message transmission/ reception buffer 1-3-5.

The two B channels 1-3-9 and 1-3-10 for voice or data are connected to the speech channel switch (SW) 1-1 of the exchange terminal 1 without any logical processing. The two B channels 1-3-9 and 1-3-10 and D channel 1-3-8 are actually time-divisoin multiplexed for digital communication, but here space division is assumed for the sake of simplicity. Thus, time-division multiplexing and demultiplexing circuits for the two B channels 1-3-9 and 1-3-10 and D channel 1-3-8 are not shown in FIG. 5.

Construction of the terminal (second example)

Figure 6:
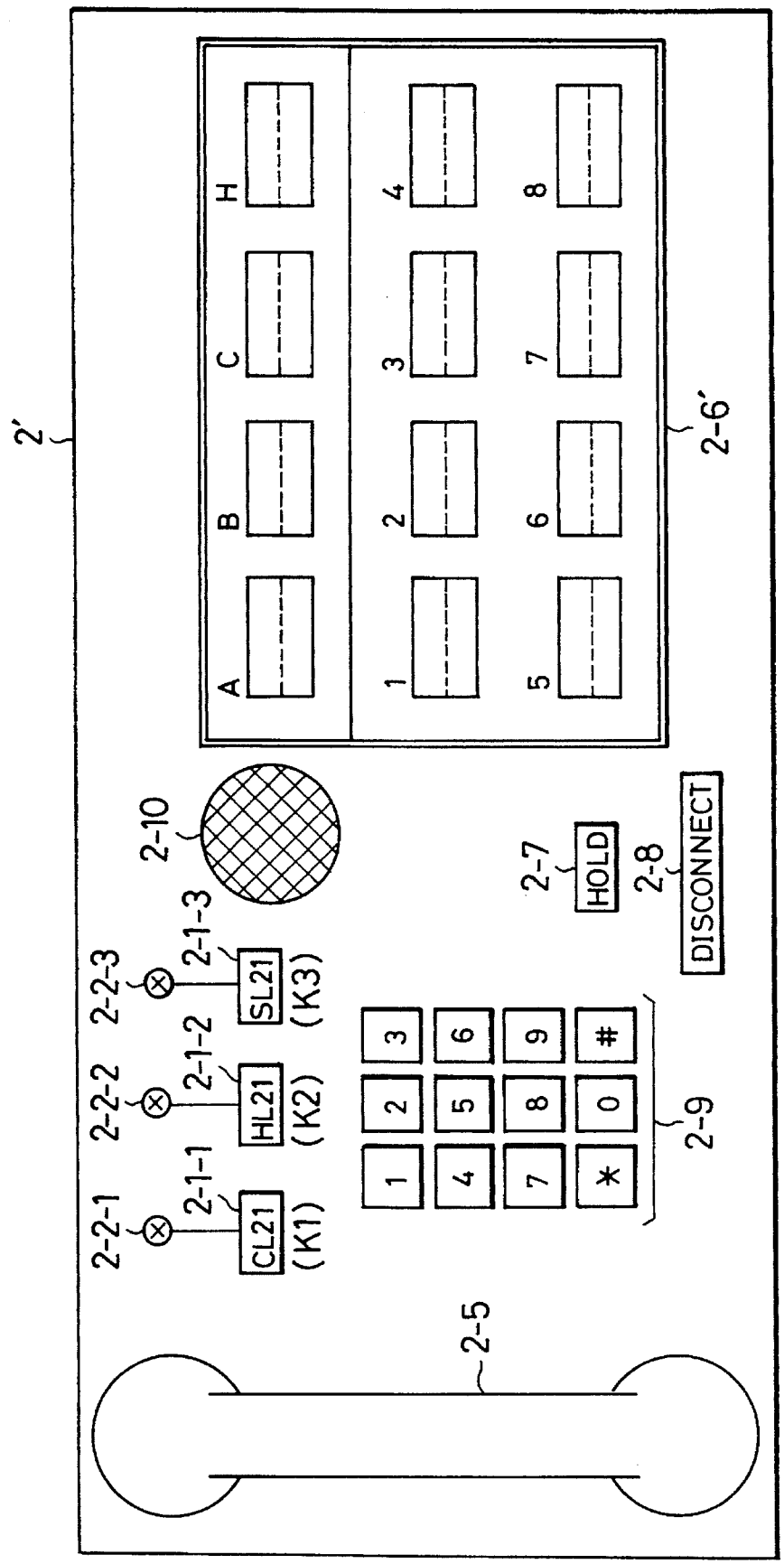
FIG. 6 is a view showing the board design of the terminal (i.e., dealing speech terminal) in a second embodiment.
Figure 7:
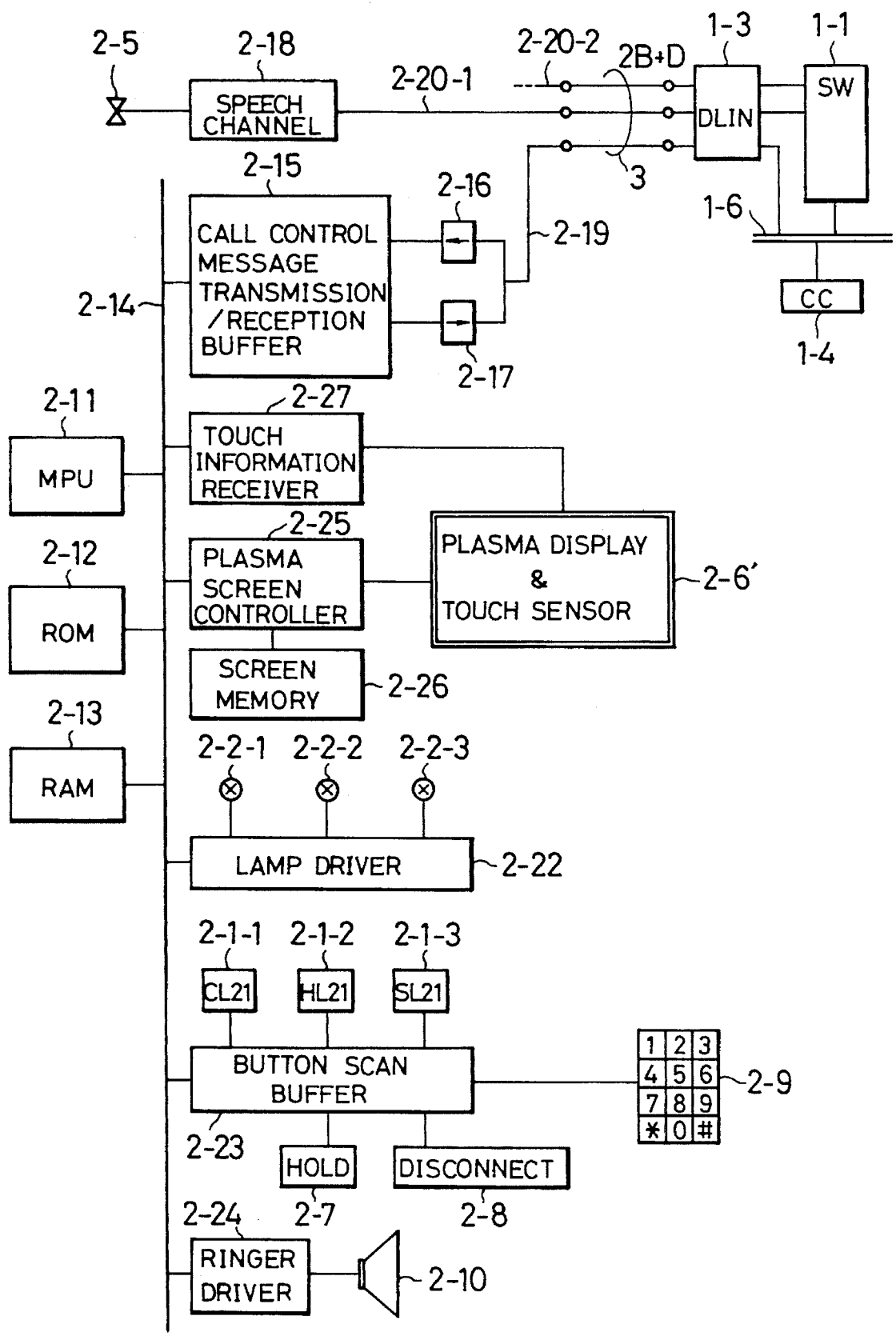
FIG. 7 is a functional block diagram showing the hardware construction of the terminal (i.e., dealing speech terminal) in the second embodiment.

Now, a second example of the terminal construction will be described. FIG. 6 is a view showing the board of the second example of the construction of terminal 2', and FIG. 7 is a functional block diagram of the same. The terminal 2' shown in FIG. 6 is the same as the terminal 2 shown in FIG. 3 except for that the buttons "A" 2-3-1, "B" 2-3-2, "C" 2-3-3 and "H" 2-3-4, lamps 2-4-1, 2-4-2, 2-4-3 and 2-4-4 respectively corresponding thereto and liquid crystal display (LCD) 2-6 in FIG. 3 are replaced with a plasma display 2-6' with touch sensor. The plasma display 2-6' with touch sensor (or touch switch) has its plasma display surface capable of display of characters and graphs provided with a sensor, for instance a sensor which senses blocking of light by an intruding finger tip or the like or senses the pressure of touch on the display surface, and the same effect as that obtainable by depressing a button can be obtained in that information at the sensed position is obtainable. The display displays names of functions of buttons or names of lines as well as button frames.

FIG. 7 is a functional block diagram showing the hardware structure of the terminal 2 having the board shown in FIG. 6. Like the board, differences from the functional block diagram of the terminal 2 in FIG. 4 will be described. The differences are that a screen controller 2-25 of a plasma display section of the plasma display 2-6' with touch sensor is controlled by the processor 2-11 via the control bus 2-14, that a screen memory 2-26 for displaying graphs or characters (such as line names) on the screen is connected to a plasma screen controller 2-25 for the memory contents to be written by the processor 2-11 via the plasma screen controller 2-25 and processed for display by the plasma screen controller 2-25 and that a touch information receiver 2-27 for receiving position information from the touch sensor section is connected to the control bus 2-14 to let the processor 2-11 receive and analyze position information at the touched point for execution of the same processing as in the case of button depression.

While the two examples of the construction of the terminal of this embodiment have been described above, the following description of operation examples will be given in conjunction with the construction example of the terminal 2 shown in FIGS. 3 and 4.

Tables and Call Control Messages

Tables

Prior to the description of operation examples, tables used by the terminal for call control and also call control messages transmitted and received between the exchange equipment and terminal will be described.

The tables of the terminal 2 are stored in the temporary memory (RAM) 2-13 shown in FIG. 4 or 7.

Figure 8:
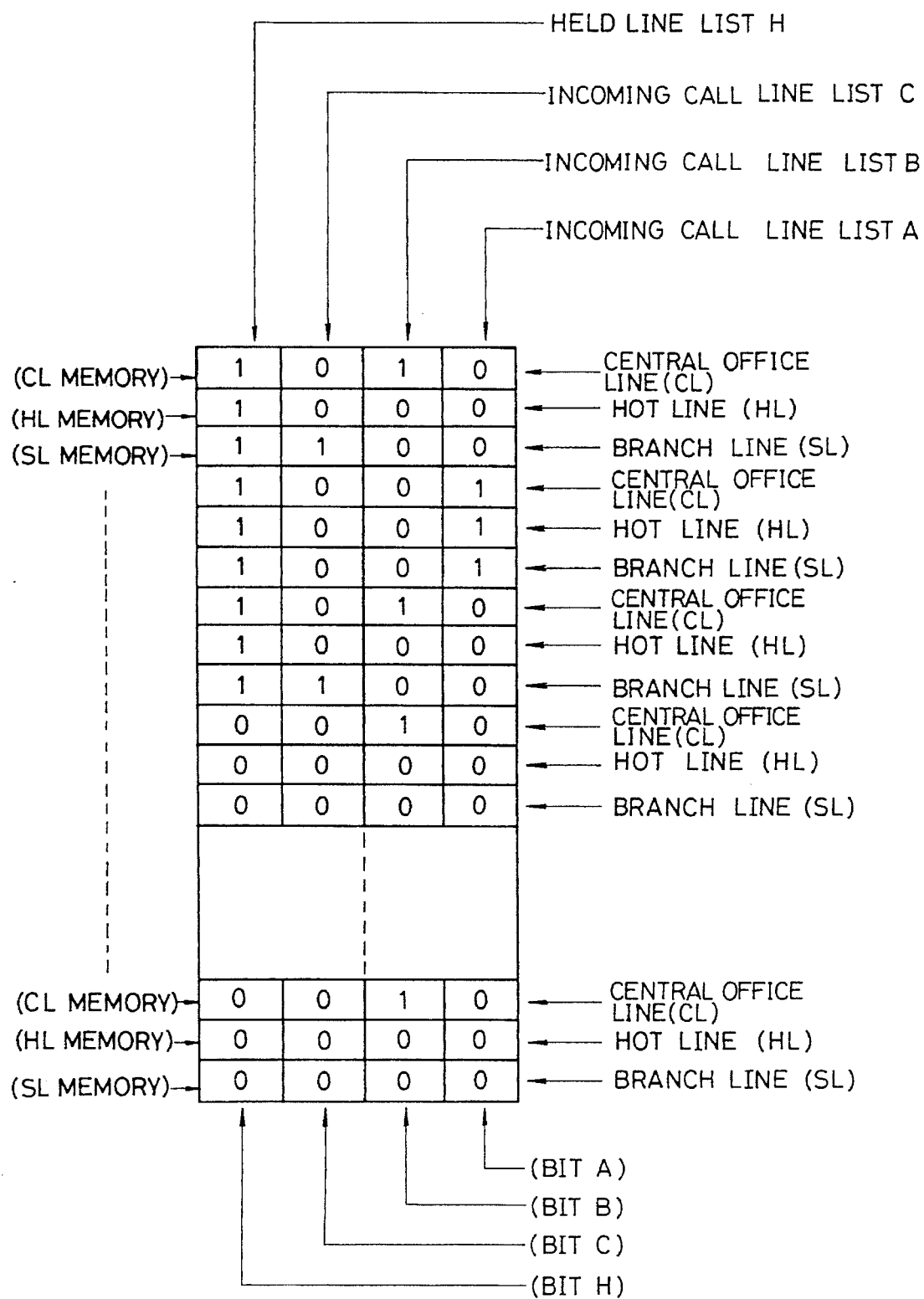
FIG. 8 is a view showing a subject-of-processing line kind table possessed by the terminal.

Further, they are preliminarily registered in conformity to the operating conditions of the terminal 2 and will never vanish due to power stoppage or like causes. Thus, they correspond to commonly termed office data. Moreover, they can be altered at any time when the operating conditions of the telephone exchange system are changed. FIGS. 8 to 10 show tables of the terminal 2 used in this embodiment.

FIG. 8 shows a subject-of-processing line kind table. This subject-of-processing line kind table has the following meaning. All the lines are divided into n groups 1 to n. In this embodiment, in case of an incoming call on a line, it is determined for each of the groups and for each of three different kinds of lines, i.e., central office line (CL), hot line (HL) and branch line (SL), whether display is to be made on the incoming call line list A (with bit A="1" representing "display" and bit A="0" representing "nondisplay"), on the incoming call line list B (bit B="1" representing "display" and bit B="0" representing "nondisplay") or on the incoming call line list C (bit C="1" representing "display" and bit C="0" representing "nondisplay"). In case of holding a line, it is determined whether display is to be made on the held line list H (with bit H="1" representing "display" and bit H ="0" representing "non-display"). The terminals 2 are also grouped, and the same subject-of-processing line kind table is registered in all the terminals 2 belonging to the same group. The contents (or bit patterns) of this table is an example, and subsequent operation examples will be described with reference to these contents.

FIG. 9 shows a line table, in which information concerning all the lines accommodated in the exchange equipment 1 is registered. This table lists line code 9-1, line kind 9-2, pertinent line group number 9-3 and line name 9-4 of each line. These data are of course stored in the form of numerals in the temporary memory 2-13. All the terminals 2 accommodated in the exchange equipment 1. register the same line table.

FIG. 10 shows a button table. This button table registers the self-accommodated lines. That is, button codes of buttons "CL21" 2-1-1 (K1), "HL21" 2-1-2 (K2) and "SL21" 2-1-3 (K3) shown in FIG. 3 or 6 and line codes 10-2 accommodated in these buttons are registered. The individual terminals register the button table freely in conformity to their own concerned buisiness categories.

While the tables possessed by the terminal 2 are described above, FIG. 1 shows an image display with lamps of incoming calls and held lines in each terminal having a table configuration of contents shown in FIGS. 8 to 10.

Figure 1:
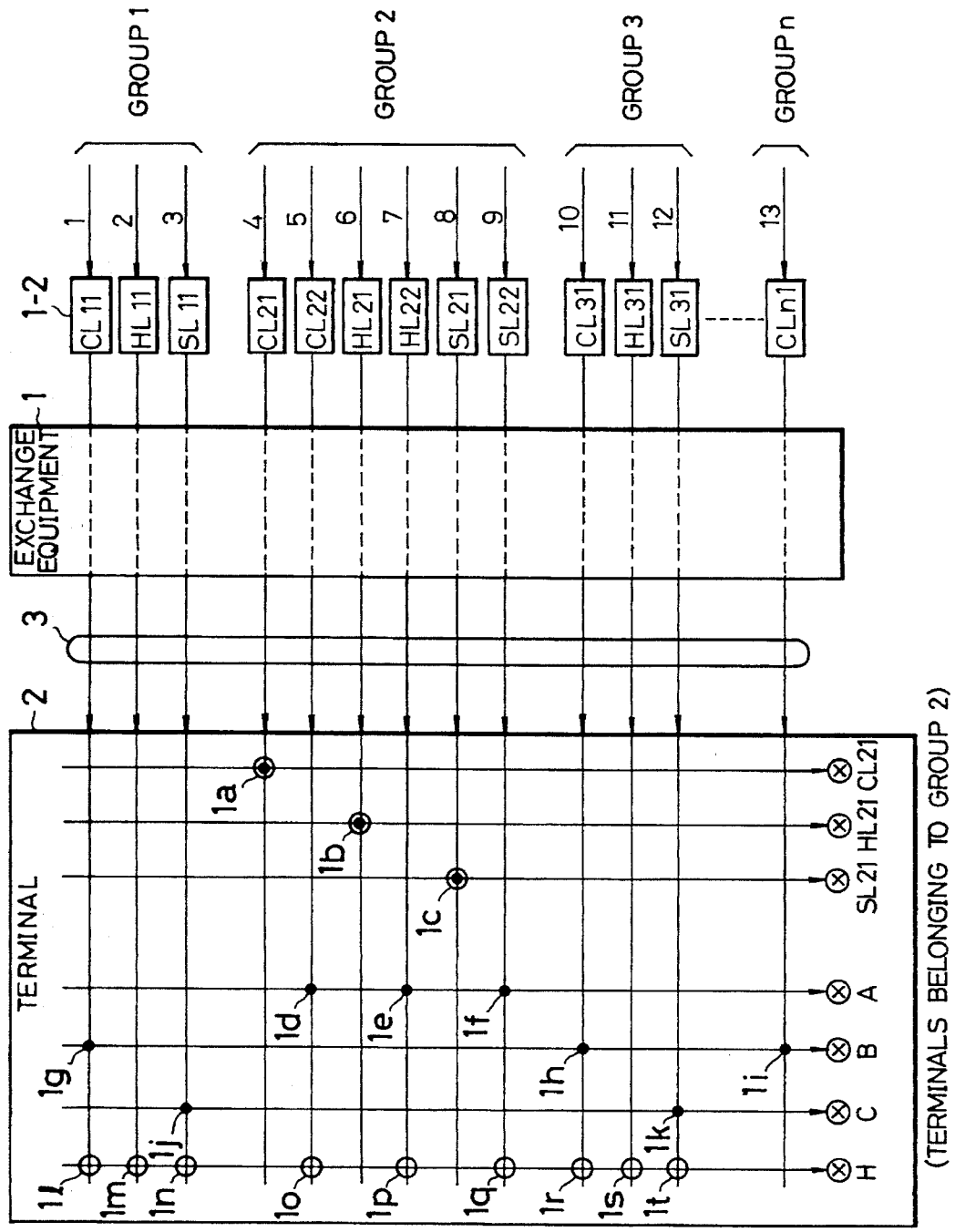
FIG. 1 is a view showing a line status display image in an embodiment of the invention.

Referring to FIG. 1, line groups 1 to n are accommodated in the exchange equipment 1. The Figure shows with a matrix diagram which ones of the lamps 2-2-2, 2-2-9, 2-4-1, 2-4-2, 2-4-3 and 2-4-4 corresponding to the respective buttons "CL21" 2-1-1, "HL21" 2-1-2, "SL21" 2-1-3, "A" 2-3-1, "B" 2-3-2, "C" 2-3-3 and "H" 4 provided in the terminal unit 2 are to be driven for display when incoming calls occur on these lines or when these lines are held. In the Figure, symbols 1d to 1k signify the display of rapid flickering indicative of an incoming call, symbols 1l to 1t signify slow flickering indicative of the display of a line holding, and symbols 1a to 1c indicate both the display of an incoming call and the display of a line holding. For example, when an incoming call is placed on the central office line CL11 belonging to the group 1, the lamp B provides an incoming call display at point 1 g. When the central office line CL11 is held, the lamp H provides a line holding display at point 1l. This matrix diagram is determined absolutely by the tables shown in FIGS. 8 to 10, and this will be described later in greater detail.

The terminal 2 that is described in connection with this embodiment is assumed to belong to the group 2.

Call control message from the exchange equipment to the terminal

Figure 11:
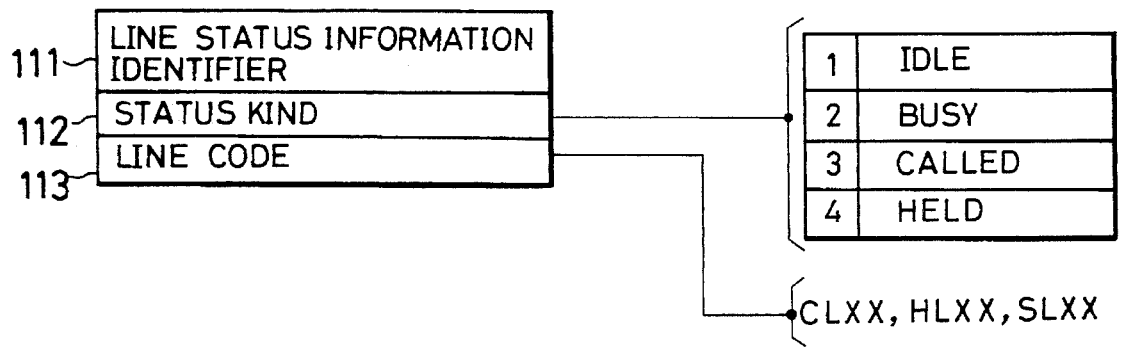
FIG. 11 is a view showing the configuration of a call control message having line status information.
Figure 12:
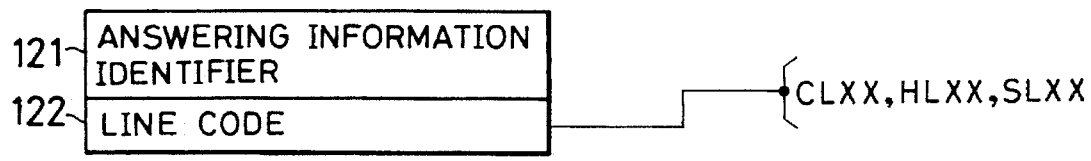
FIG. 12 is a view showing the configuration of a call control message having answering information.
Figure 13:
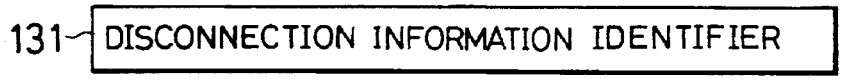
FIG. 13 is a view showing the configuration of a call control message having disconneciton information.
Figure 14:
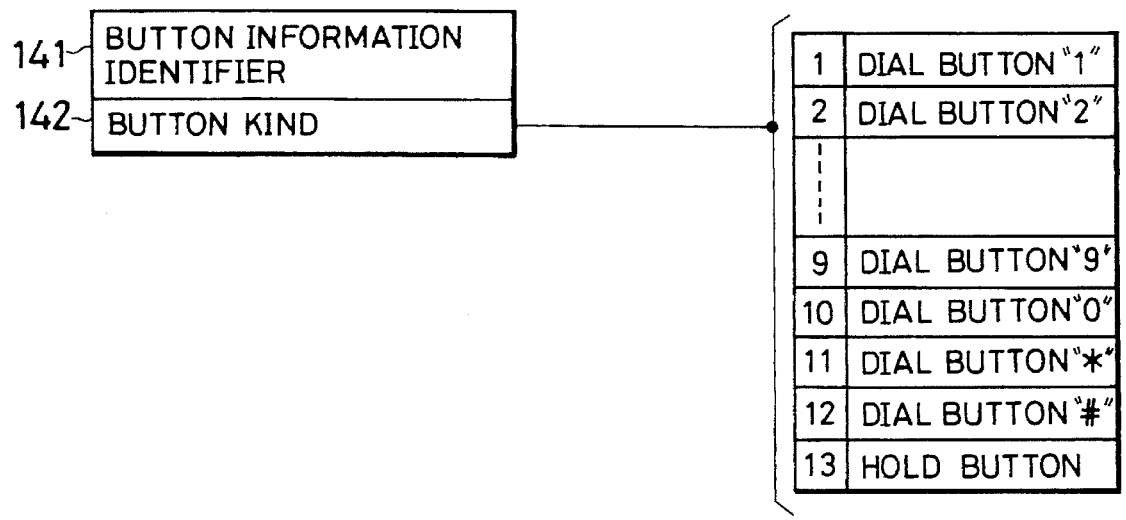
FIG. 14 is a view showing the configuration of a call control message having button information.

Now, the call control message will be described. In this embodiment the protocol of communication between the exchange equipment I and terminal 2 conforms to the ISDN basic rate interface advised by the CCITT. However, the layer 3, i.e., content of the call control message, has a configuration to be described later. Each call control message to be described hereinunder is transmitted on the D channel. FIG. 11 shows a call control message transmitted from the exchange equipment to the terminal 2, and FIGS. 12 to 14 show call control messages transmitted from the terminal 2 to the exchange equipment 1. The start of the call control messages shown in FIGS. 11 to 14 is provided with an identifier for identification of information on the receiving side.

FIG. 11 shows a call control message (or line status information) for notifying the terminals 2 of every line status change from the exchange equipment 1. The identifier is a line status information identifier 111. This line status information includes information (status kind) 112 indicative of the changed status such as "idle", "busy", "called" and "held" and information (line code) 113 indicative of the code of the pertinent line.

Call control message from the terminal to the exchange equipment

FIG. 12 shows a call control message (or answering information) which is transmitted when the terminal 2 answers an incoming call or holding. The identifier is an answering information identifier 121. The answering information contains information (line code) indicative of the code of the answering line.

FIG. 13 shows a call control message (disconnection information) which is transmitted when disconnecting a busy line. The identifier is a disconnection information identifier 131. The disconnection information contains no other information.

FIG. 14 shows a call control message (button information) which is transmitted when a button is depressed. The identifier is a button information identifier 141. The button information contains information (button kind) indicating kinds of buttons such as dial buttons "1" to "0" "*" and "#" and "hold" button.

Call control

Brief Description of the Drawings Now, a specific call control operation example will be described. FIGS. 15-A and 15-B are views showing an operation sequence when an incoming call is placed, and FIGS. 16-A and 16-B are views showing an operation sequence when holding a line. Further, FIGS. 17-A and 17-B are views showing a flowchart of processing when the terminal 2 receives line status information from the exchange equipment 1.

Figure 18:
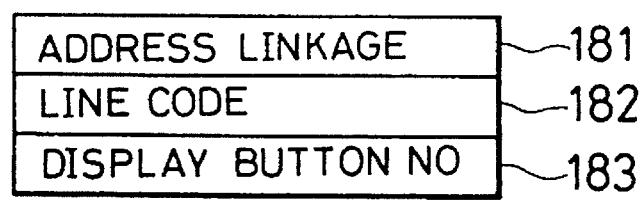
FIG. 18 is a view showing the configuration of a display processing transaction.

FIG. 18 shows the configuration of a display processing transaction used when the terminal 2 receives line status information from the exchange equipment 1 and displays the line name on the liquid crystal display or plasma display 2-6'. The transaction consists of an address linkage 181 for logical connection between transactions, a line code 182 as a subject of display processing, and a button code 183 indicating a position of display on the liquid crystal display 2-6 or plasma display 2-6'. The display processing transaction is provided on the temporary memory 2-13 of the terminal 2. A plurality of transactions are prepared such that they correspond in number to the number of lines.

Figure 19:
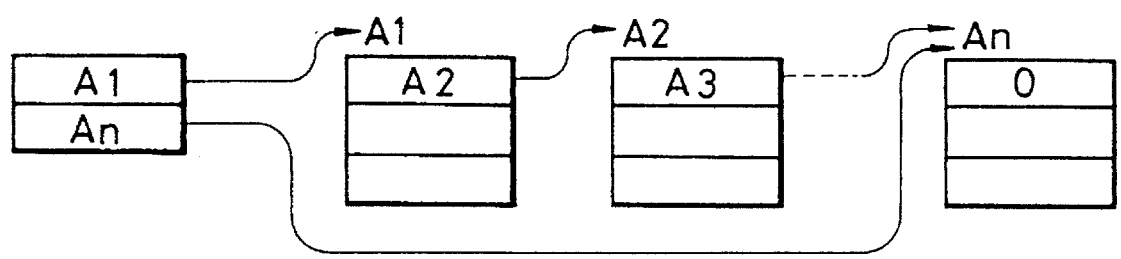
FIG. 19 is a view showing a state of logical connection of the display processing transaction to an idle chain.

FIG. 19 is a view showing n display processing transactions logically connected to one another with an idle chain pointer placed at the first, the transactions being shown in a waiting state. When the terminal 2 has to execute a line name display processing with reception of line status information, it separates one display processing transaction from the idle chain shown in FIG. 19, then writes necessary data in that transaction and then connects the transaction to various cue pointers shown in FIG. 20.

FIG. 20 shows the connection status of the incoming call line list A cue pointer 20-1 for logically connecting lines contained in the incoming call line list A which is displayed when the button "A" 2-3-1 in the terminal 2 shown in FIG. 3 is depressed or when the button "A" section in the terminal 2' shown in FIG. 6 is touched, the incoming call line list B cue pointer 20-2 for logically connecting lines contained in the incoming call line list B which is displayed when the button "B" 2-3-2 is depressed or when the button "B" section is touched, the incoming call line list C cue pointer 20-3 for logically connecting lines contained in the incoming call line list C when the button "C" 2-3-3 is depressed or when the button "C" section is touched, and the held line list H cue pointer 20-4 for logically connecting lines contained in the held line list H which is displayed when the button "H" 2-3-4 is depressed or when the button "H" section is touched. FIG. 20 shows the status of logical connection of the display processing transactions with incoming calls placed on all the lines shown in FIG. 1.

Figure 21:
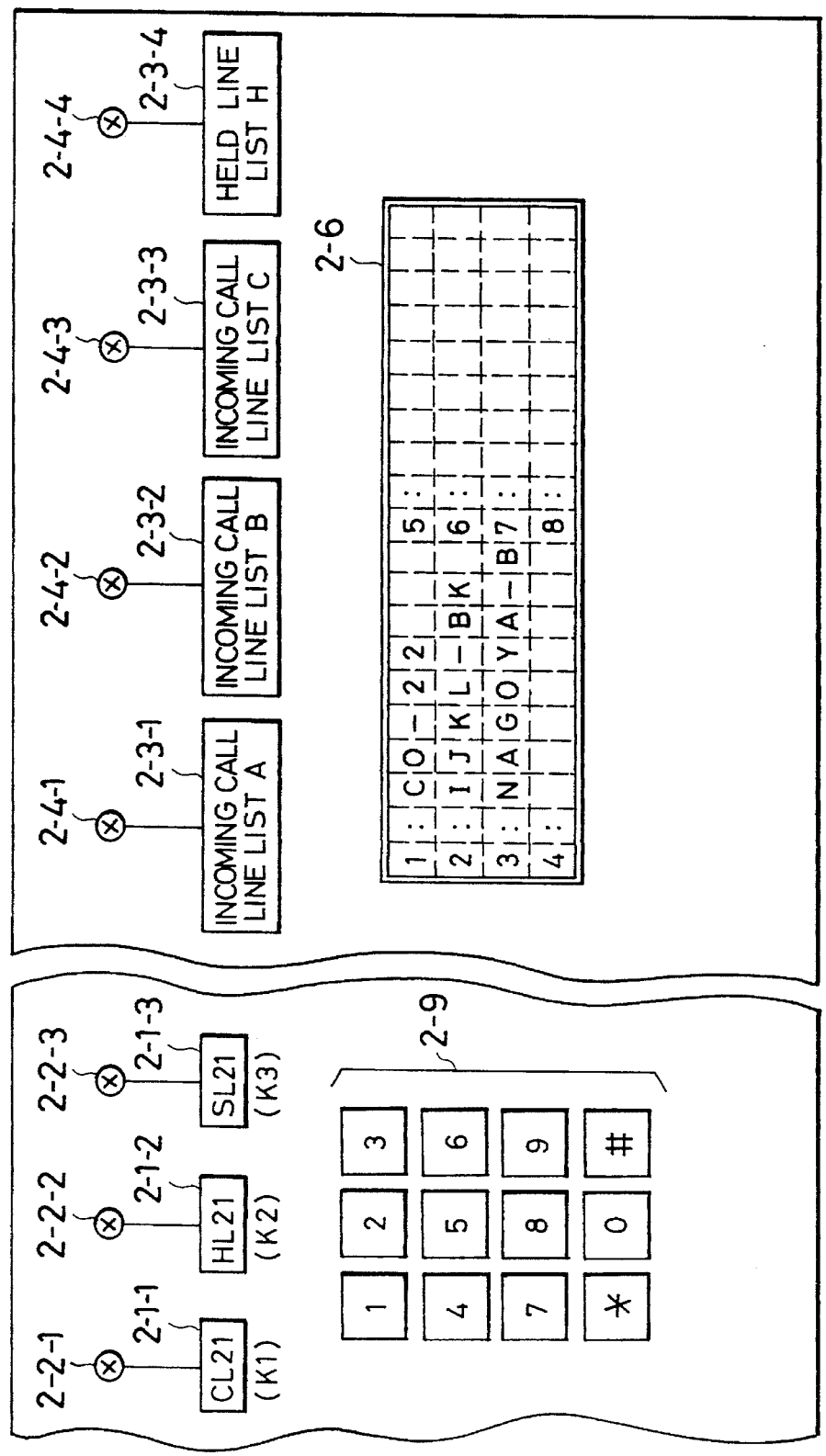
FIG. 21 is a view showing a display using a liquid crystal display.
Figure 22:
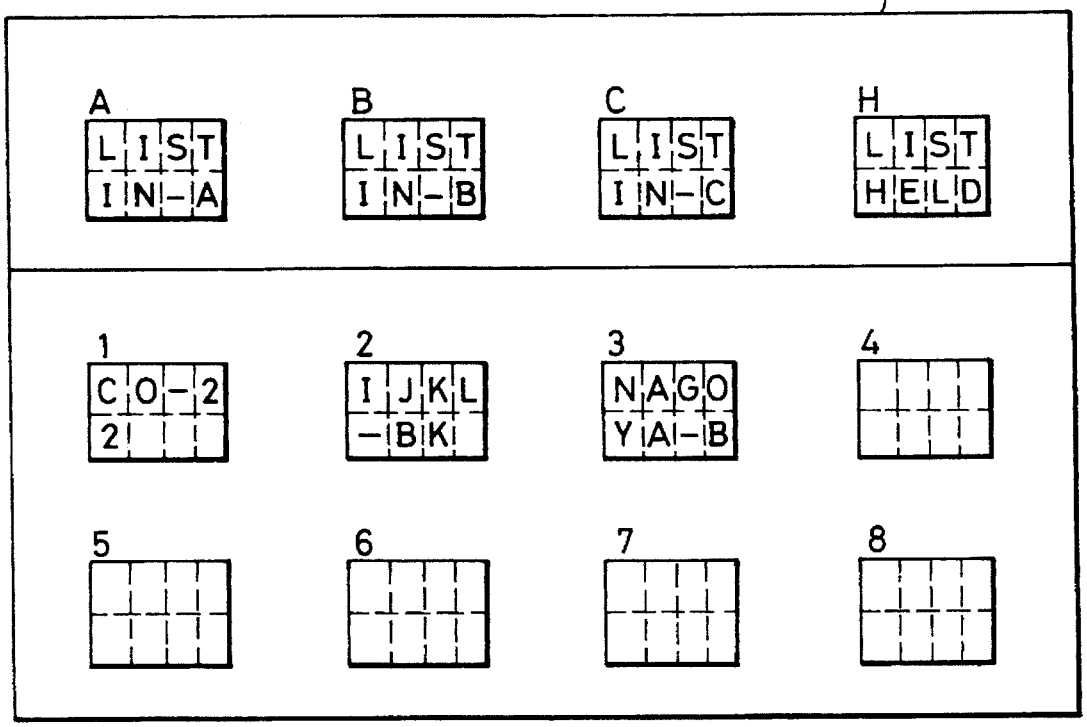
FIG. 22 is a view showing a display using a plasma display.

FIG. 21 is a view showing an example of display of the incoming call line list A on the liquid crystal display 2-8 which is provided when the button "A" 2-3-1 in the terminal 2 shown in FIG. 3 is depressed. FIG. 22 is a view showing an example of display of the incoming call line list A on the plasma display 2-6' which is provided when the button "A" section in the terminal 2' shown in FIG. 6 is touched. In either case, information contained in display processing transactions connected to the incoming call line list A cue pointer 20-1 shown in FIG. 20 is reflected.

Call control in case of incoming call

Now, the call control will be described specifically.

Referring to FIG. 15-A, when the exchange equipment 1 detects an incoming call on a line (1501, FIG. 15-A), the exchange equipment 1 sends out line status information incidating the incoming call inclusive of the code of the incoming call line to all the terminals (1502, FIG. 15-A).

(In FIG. 15-A, symbol ALL signifies sending to all the terminals.)

When the terminal 2 recognizes the reception of the line status information (1502, FIG. 15-A) from the exchange equipment 1 (1503, FIG. 15-A), it checks whether the line corresponding to the line code (113, FIG. 11) contained in the line status information is accommodated in any of its buttons "CL21" 2-1-1, "HL21" 2-1-2 and "SL21" 2-1-3). If the line is accommodated, it causes rapid flickering of the line lamp (i.e., either lamp CL21, HL21 or SL21) corresponding to the button to indicate that an incoming call is placed (1505, FIG. 15-A). If the line is not accommodated, it checks whether the line is a subject of the incoming call display processing (1506, FIG. 15-A). If the line is not any subject, it makes a line status information (1502, FIG. 15-A) null and does not execute any subsequent processing. If the line is the subject, it determines a lamp (i.e., either lamp A, B or C) for incoming call display and causes rapid flickering of that lamp (1507, FIG. 15-A). The above line status information reception processing will be described in greater detail with reference to the flow chart of FIG. 17-A and 17-B tables in the terminal 2 as shown in FIGS. 8 to 10 and transactions shown in FIGS. 18 and 19.

Referring to FIG. 17, when the terminal 2 receives the line status information from the exchange equipment 1, it extracts the line code from the line status information (step 1701) and checks whether the corresponding line is accommodated in a button of its own through retrieval of the button table shown in FIG. 10 (step 1702). If the line is accommodated in its own button, it checks the status kind (112, FIG. 11) contained in the line status information (step 1703). If the status is "called", it causes rapid flickering of the line lamp corresponding to the button selected with reference to the button table shown in FIG. 10 (step 1706) and then ends the processing. If it is found in the step 1702 that the corresponding line is accommodated in none of its own buttons, the terminal first extracts the number of the group, to which the line belongs, with reference to the line table shown in FIG. 9 (step 1708) and then checks the kind of the line (step 1709). If it is found as a result of the check that the line is a central office line, the terminal extracts the CL memory of the corresponding group, with reference to the subject-of-processing line kind table shown in FIG. 8 (step 1710). If the line is a hot line, the terminal extracts the HL memory (step 1711). If the line is a branch line, the terminal extracts the SL memory (step 1712).

Then, the terminal checks the status kind (112, FIG. 11) contained in the line status information (step 1713). If the status is "called", it checks the bit A of the memory which is extracted in step 1710, 1711 or 1712 (step 1714). If the bit is "1", it executes a processing for displaying the line name in the incoming call line list A (step 1715). If the bit is "0", the bit B of the memory is checked (step 1716). If this bit is "1", it executes a processing for displaying the line name in the incoming call line list B (step 1717). If the bit is "0", the bit C of the memory is checked (step 1718). If this bit is "1", it executes a processig for displaying the line name in the incoming call line list C (step 1719). If the bit is "0", it nullifies the line name display.

Display Processing Transactions

In the above operation the list for displaying the line name therein is determined. Now, operation concerning the display processing transactions shown in FIGS. 18, 19 and 20 will be described.

It is now assumed that incoming calls are placed in the order of numbers 1, 2, . . . , 13 in FIG. 1. With an incoming call on the line CL11, which is found in the above operation to be a central office line (CL) belonging to the group 1, the bit B is "1" from the subject-of-processing line kind table shown in FIG. 8, and thus it is determined to execute the line name display processing with respect to the incoming call line list B (point 1 g, FIG. 1). Thus, the terminal 2 separates the first one (A1) of the display processing transactions in the idle chain shown in FIG. 19, then writes the line code CL11 in the line code section 182 and "1" in the display button number section 183 of the display processing transaction, and then logically connects the transaction to the incoming call line list B cue pointer 20-2 shown in FIG. 20 (20-2-1, FIG. 20). With a second incoming call placed on the line HL11, which is a hot line (HL) belonging to the group 1, the bits A, B and C are all "0" as found from the subject-of-processing line kind table shown in FIG. 8, and thus no line name display processing is executed.

With a subsequent third incoming call placed on the line SL11, which is a branch line (SL) belonging to the group 1, the bit C is "1" as found from the subject-of-processing line kind table shown in FIG. 8, and it is thus determined to execute the line name display processing with respect to the incoming call line list C (point 1j, FIG. 1). Thus, the terminal 2 separates the first one (A2) of the display processing transactions in the idle chain shown in FIG. 19, then writes the line code SL11 in the line code section 182 and "1" in the display button number section 183 of the display processing transaction, and then logically connects the transaction to the incoming call line list C cue pointer 20-3 shown in FIG. 20 (20-3-1, FIG. 20).

With a subsequent fourth incoming call placed on the line CL21, since the corresponding line is found from the button table shown in FIG. 10 to be accommodated in the button code K1 (button table name CL21), the lamp CL corresponding to the button "CL21" 2-1-1 is driven for the display of the incoming call (point 1a, FIG. 1).

With subsequent fifth, sixth and so forth incoming calls up to the thirteenth incoming call placed successively, an evantual display processing transaction logical connection state as shown in FIG. 20 results. Specifically, the logical connection to the incoming call line list A cue pointer 20-1 is obtained with the line CL22 (point 1d, FIG. 1) written in the transaction A3 (20-1-1), the line HL22 (point 1e, FIG. 1) written in the transaction A4 (20-1-2) and the line SL22 (point 1f, FIG. 1) written in the transaction A5 (20-1-3), the logical connection to the incoming call line list B cue pointer 20-2 is obtained with the line CL11 (point FIG. 1) written in the transaction A1 (20-2-1), the line CL31 (point 1h, FIG. 1) written in the transaction A6 (20-2-2) and the line CLn1 (point 1i, FIG. 1) written in the transaction AS (20-2-3), and the logical connection of the incoming call line list C cue pointer 20-3 is obtained with the line SL11 (point 1j, FIG. 1) written in the transaction A2 (20-3-1) and the line SL31 (point 1k, FIG. 1) written in the transaction A7 (20-3-2). To the held line list H cue pointer 20-4 no display processing transaction is logically connected because of absence of any held line.

Referring back to FIG. 15-A, with depression of the button "A" 2-3-1 corresponding to the lamp A in a flickering state to incidate an incoming call (1508, FIG. 15-A), the call control processor 2-1-1 of the terminal 2 detects the depressed button to be the incoming call line list A display button (1309, FIG. 15-A) and displays the incoming call line list A on the liquid crystal display 2-6 (1510, FIG. 15-A). Further, it drives the lamp A to indicate that the incoming call line list A is being displayed (1511, FIG. 15-A). FIG. 21 shows the contents displayed on the liquid crystal display 2-6 at this time. The line name is displayed on the liquid crystal display 2-6 according to the display processing transaction logically connected to the incoming call line list A cue pointer 20-1 shown in FIG. 20. The processor derives the name of the line CL22 written in the transaction A3 (20-1-1) to be "co-22" from the line table shown in FIG. 9 and causes display of the name at the position of the button No. 1. In this embodiment, alphabet and Arabic numerals are used for display. The processor then determines from the line table shown in FIG. 9 that the line name of the corresponding to the line code HL22 written in the transaction A4 (20-1-2) "IJKL-BK (Bank)" and causes display of the name at the position of the button No. 2. Also, it determines from the line table shown in FIG. 9 that the line name corresponding to the line code SL22 written in the transaction A5 (20-1-3) is "Nagoya-B (Branch)" and causes display of the name at the position of the button No. 3. Further, FIG. 22 shows a case when the incoming call line list A is displayed on the plasma display 2-6' in the terminal 2' in the same operation.

Referring back to FIG. 15-A, if the operator of the terminal 2 intends to answer "Nagoya Branch" by confirming the incoming call line list A on the liquid crystal display 2-6 shown in FIG. 21, the operator operates the dial key set 2-9. In this case, the operator depresses the dial keys "*", and 3 (1512, FIG. 15). When these dial keys are "second answering means" there are more than eight incoming calls in the incoming call line list A, line names are displayed on all the display buttons No. 1 to No. 8 of the liquid crystal display 2-6, and by depressing a dial button "#" for instance, the incoming calls on the 9th to 16th lines on the second page are displayed. The call control processor 2-11 can answer the incoming calls on the 9th to 16th lines through page control in response to operation of the keys "*" "1" to "*" "8" The call control processor 2-11 is holding page information of the lists displayed on the temporary memory 2-13, and with this information and also with operation of the keys "*" and "3" it finds out the transaction A5 holding the button No. 3 among the display processing transactions logically connected to the incoming call line list A cue pointer 20-1, thus extracting the corresponding line code SL22 (1513, FIG. 15-A). The terminal 2 sends out answering information containing the line code SL22 to the exchange equipment 1 (1514, FIG. 15-A).

When the exchange equipment 1 receives this answering information (1515, FIG. 15-A), it checks whether the corresponding line can be answered (1516, FIG. 15-A). If the line can not be answered, the exchange equipment transmits a busy tone (BT) to the speech channel (i.e., B channel as noted above) of the terminal 2. If the line can be answered, it executes answering processings of closing the loop and so forth with respect to the line (1517, FIG. 15-A) and sends out line status information including the code of the line made busy by answering to all the terminals (1518, FIG. 15-A).

When the terminal 2 confirms reception of the line status information (1518, FIG. 15-A) from the exchange equipment 1 (1519, FIG. 15-A), it checks whether the line corresponding to the line code (113, FIG. 11) contained in the line status information is accommodated in its own button (1520, FIG. 15-A). If the line is accommodated, it turns on the line lamp corresponding to the button to indicate that the line is busy (1521, FIG. 15-A). If the line is not accommodated, it checks whether the line was a subject of the incoming call or holding display processing (1522, FIG. 15-A). If the line is not any subject of processing, it nullifies the line status information (1518, FIG. 15-A) and does not execute any subsequent processing. If the line is a subject of processing, it deletes the line name displayed on the liquid crystal display 2-6 (1523, FIG. 15-A) and determines the lamp (i.e., either lamp A, B or C) having been driven for the incoming call of holding display for turning off the determined lamp (1524, FIG. 15-A). If there are other lines, on which incoming calls are placed or which are held, the incoming call display or held line display is continued.

The above line status information reception processing will be described in greater detail with reference to the flow charts of FIGS. 17-A and 17-B, terminal tables shown in FIGS. 8 to 10 and display processing transactions shown in FIGS. 18 and 19.

Referring to FIG. 17-A, when the terminal 2 receives the line status information from the exchange equipment 1, it extracts the line code from the line status information (step 1701) and checks whether the corresponding line is accommodated in its own button through retrieval of the button table shown in FIG. 10 (step 1702). If the line is accommodated in its own button, it checks the status kind (112, FIG. 11) contained in the line status information (step 1703). If the status is "busy", it turns on the line lamp corresponding to the button determined from the button table shown in FIG. 10 (step 1705) and ends the processing. If it is found in the step 1702 that the corresponding line is accommodated in none of its buttons, it extracts the number of the group, to which the line belongs, with reference to the line table shown in FIG. 9 (step 1708) and then checks the kind of the line (step 1709). If it is found as a result of the check that the line is a central office line, the terminal extracts the CL memory of the corresponding group with reference to the subject-of-processing line kind table shown in FIG. 8 (step 1710). If the line is a hot line, the terminal extracts the HL memory (step 1711). If the line is a branch line, it extracts the SL memory (step 1712).

Then, the terminal checks the status kind (112, FIG. 11) contained in the line status information (1518, FIG. 15-A) (step 1713). If the status is "busy", it checks the bit A of the memory extracted in the step 1710, 1711 or 1712 (step 1722, FIG. 17-B). If the bit is "1", the terminal executes line name deletion processing with respect to the incoming call line list A (step 1723).

The line name deletion processing will now be described. The terminal checks for any display processing transaction logically connected to the incoming call line list A cue pointer 20-1 shown in FIG. 20 with reference to the line code. If a corresponding transaction is found out, the terminal extracts the display button No. held in that transaction and deletes the line name at the corresponding button position on the liquid crystal display 2-6 or plasma display 2-6'. Also, it separates the display processing transaction from the logical connection of the incoming call line list A cue pointer and logically connects again the separated transaction to the idle chain shown in FIG. 19 to be ready for the next display processing. It is possible in the step 1723 shown in FIG. 17-B that no line is found to be logically connected to the incoming call line list A cue pointer 20-1. In this case, the terminal checks the bit H of the memory extracted in the step 1710, 1711 or 1712 (step 1728) If the bit is "1", it executes line name deletion processing with respect to the held line list H (step 1729). This operation is the same as the operation described above for deleting the line name through retrieval of the incoming call line list A cue pointer.

Referring back to step 1722 in FIG. 17-B, if the bit A of the memory is "0" the terminal checks the bit B (step 1724) If the bit B is "1" it executes line name deletion processing with respect to the incoming call line list B (step 1725) If the bit B is "0" it checks the bit C (step 1726) If the bit C is "1" it executes line name deletion processing with respect to the incoming call line list C (step 1727) If the bit C is "0" the terminal checks the bit H (step 1728) If the bit H is "1" it executes line name deletion processing with respect to the held line list H (step 1729) and ends the processing. If the bit H is "0" it nullifies the line name deletion processing. The operations of the display processing transactions accompanying the line name deletion processings with respect to the incoming call line lists B, C and the held line list H are the same as the line name deletion processing with respect to the incoming call line list A, so their description is not given.

With the above operation, the speech handset 2-5 of the terminal 2 becomes busy with the answered line (1525, FIG. 15-A).

To disconnect the busy line, the operator of the terminal 2 depresses the button "disconnect" 2-8 (1526, FIG. 15-B). As a result, the call control processor 211 detects this (1527, FIG. 15-B) and sends out disconnect information to the exchange equipment 1 (1528, FIG. 15-B). When the exchange equipment 1 receives the disconnect information (1529, FIG. 15-B), it executes a processing of disconnecting the busy line with the terminal 2 (1530, FIG. 15-B). The exchange equipment 1 then sends out line status information about the line, which has been disconnected and is now idle, inclusive of the line code to all the terminals (1531, FIG. 15-B).

When the terminal 2 recognizes the reception of the line status information (1531, FIG. 15-B) from the exchange equipment 1 (1532, FIG. 15-B), it checks whether the line corresponding to the line code (113, FIG. 11) contained in the line status information is accommodated in its own button (1533, FIG. 15-B). If the line is accommodated, it turns off the line lamp corresponding to the button to indicate that the line has become idle (1534, FIG. 15-B). If the line is not accommodated, it checks whether the line was a subject of incoming call or holding display processing (1535, FIG. 15-B). If the line is not any subject of processing, it nullifies the line status information (1531, FIG. 15-B) and does not execute any subsequent processing. If the line is a subject of processing, it deletes the line name displayed on the liquid crystal display 2-6 (1536, FIG. 15-B) and determines the lamp (i.e., either lamp A, B or C) which has been displaying an incoming call or holding for turning off the lamp (1537, FIG. 15-B). If there are other incoming calls or held lines, the incoming call display or holding display is continued.

The above line status information reception processing will be described in greater detail with reference to the flow charts of FIGS. 17-A and 17-B, terminal tables shown in FIGS. 8 to 10 and display processing transactions shown in FIGS. 18 and 19.

When the terminal 1 receives line status information from the exchange equipment 2, it extracts the line code from the line status information (step 1701) and checks whether the corresponding line is accommodated in its own button through retrieval of the button table shown in FIG. 10 (step 1702). If the line is accommodated in its own, it checks the status kind (112, FIG. 11) contained in the line status information (step 1703). If the status is "idle", it turns off the line lamp corresponding to the button determined from the button table shown in FIG. 10 (step 1704) and ends the processing. If it is found in the step 1702 that the corresponding line is accommodated in none of its own buttons, it executes the steps 1708 and 1709, one of the steps 1710, 1711 and 1712 and step 1713 in FIG. 17 as in the case of the status kind of "busy" and then executes the processing of the steps 1722 through 1729 to effect the line name deletion processing. The detailed operation of the line name deletion processing is entirely the same as in the case of the status kind of "busy", so its description is not given.

With the above operation, the speech handset 2-5 of the terminal 2 is disconnected from the busy line to be ready for the next call control, i.e., operations of answering to an incoming call, placing of an outgoing call and so forth.

The above description of the incoming call sequence does not contain any description concerning the control of the incoming call ringer 2-10 shown in FIGS. 3 and 6. This control is made with a suitable table for driving or not driving the ringer. For example, the control is made on the basis of a table, which instructs driving the ringer when rapid flickering of the lamp CL21, HL21 or SL21 is caused, i.e., when an incoming call is placed on a line accommodated in the own terminal, while instructing, when an incoming call is placed on a line not accommodated in the own terminal, to drive the ringer if the incoming call corresponds to the lamp A and not drive the ringer if the incoming call corresponds to the lamp B or C. (Control concerning the incoming call ringer 2-10 is not shown in the incoming call sequence flow charts of FIGS. 15-A and 15-B and call control flow charts of FIGS. 17A and 17-B).

Call control in case of line holding

Now, call control in case of line holding will be described with reference to FIGS. 16-A and 16-B.

Referring to FIG. 16-A, when the operator of the terminal 2 depresses the button "hold" 2-7 (1602, FIG. 16-A) while the speech handset 2-5 of the terminal 2 is busy with a line accommodated in the exchange equipment 1 (1601, FIG. 16-A), the call control processor 2-11 detects this (1603, FIG. 16-A) and transmits button information containing the hold button code to the exchange equipment 1 (1604, FIG. 16-A). When the exchange equipment 1 receives the button information (1604, FIG. 16-A) (1605, FIG. 16-A), it checks whether the corresponding line can be held (1606, FIG. 16-A). If the line cannot be held, it nullifies the button information (1604, FIG. 16-A). If the line can be held, it executes a line holding processing such as sending out a hold tone to the line (1607, FIG. 16-A) and sends out line status information of the held line inclusive of the line code thereof to all the terminals (1608, FIG. 16-A).

When the terminal 2 recognizes the reception of the line status information (1608, FIG. 16-A) from the exchange equipment 1 (1609, FIG. 16-A), it checks whether the line corresponding to the line code (113, FIG. 11) contained in the line status information is accommodated in its own button (1610, FIG. 16-A). If the line is accommodated, it causes slow flickering of the line lamp corresponding to the button to indicate that the line is held (1611, FIG. 16-A). If the line is not accommodated, it checks whether the line is a subject of the holding display processing (1612, FIG. 16-A). If the line is not a subject of processing, it nullifies the line status information (1608, FIG. 16-A) and does not execute any subsequent processing. If the line is a subject of processing, it causes slow flickering of the lamp H for the display of holding (1613, FIG. 16-A).

The above line status information reception processing will now be described in greater detail with reference to the flow charts of FIGS. 17-A and 17-B, terminal tables shown in FIGS. 8 to 10 and display processing transactions shown in FIGS. 18 and 19.

When the terminal 2 receives the line status information from the exchange equipment 1, it extracts the line code from the line status information (step 1701) and checks whether the corresponding line is accommodated in its own button through retrieval of the button table shown in FIG. 10 (step 1702). If the line is accommodated in itself, it checks the status kind (112, FIG. 11) contained in the line status information (step 1703). If the line status is "held" it causes slow flickering of the line lamp corresponding to a button determined from the button table shown in FIG. 10 (step 1707) and ends the processing. If it is found in the step 1702 that the corresponding one is accommodated in none of its own buttons, it extracts the the number of the group, to which the line belongs, with reference to the line table shown in FIG. 9 (step 1708) and then checks the kind of the line (step 1709). If the line is a central office line, it extracts the CL memory of the corresponding group with reference to the line kind table shown in FIG. 8 (step 1710). If the line is a hot line, it extracts the HL memory (step 1711). If the line is a branch line, it extracts the SL memory (step 1712). Then it checks the status kind (112, FIG. 11) contained in the line status information (step 1713). If the status is "held", it checks the bit H of the memory extracted in the step 1710, 1711 or 1712 (step 1720). If the bit is "1", it executes a processing of displaying the line name in the held line list H (step 1721). If the bit is "0", it nullifies the line name deletion processing.

The operation of the line name deletion processing with respect to the held line list H is the same as the incoming call line name display processing described before. That is, a display processing transaction having the configuration as shown in FIG. 18 is separated and, after writing necessary information in it, is logically connected to the held line list H cue pointer shown in FIG. 20. In other words, if the held line is the central office line CL11, the holding is displayed by the lamp H at the point 11 in the matrix of FIG. 1. FIG. 20 shows an example without any held line, with the held line list H cue pointer being logically connected.

Referring back to FIG. 16-A, when the button "H" 2-3-4 corresponding to the lamp H being flickered to display the holding is pressed (1614, FIG. 16-A), the call control processor 2-11 in the terminal 2 detects the button as the held line H display button (1315, FIG. 16-A) and displays the held line list H on the liquid crystal display 2-6 (1616, FIG. 16-A). Further, it turns on the lamp H to indicate that the held line list H is being displayed (1617, FIG. 16-A). This display on the liquid crystal display 2-6 is made with the same format is that of FIG. 21, showing an example of display of the incoming call line list A. When the operator of the terminal 2 confirms from the held line list H displayed on the liquid crystal display 2-6 that "co-11" is displayed at the display position of the first button, for instance, and intends to answer this, the operator operates the dial key set 2-9. For example, the operator operates dial keys "," and "1" (1618, FIG. 16-A). As a result, the call control processor 2-11, which holds the list display on the temporary memory 2-13, extracts, according to this information and the operation of the keys "*" and "1" the corresponding line code, for instance CL11, by finding out a transaction holding the button No. 1 among the display processing transactions logically connected to the held line list H cue pointer 20-4 (1619, FIG. 16-A). The terminal 2 then transmits answering information containing the line code CL11 to the exchange equipment 1 (1620, FIG. 16-A).

When the exchange equipment 1 receives the answering information (1621, FIG. 16-A), it checks whether the corresponding line can be answered (1622, FIG. 16-A). If the line can not be answered, it nullifies the answering information (1620, FIG. 16-A). If the line can be answered, it executes an answering processing such as stopping the hold tone having been transmitted to the line (1623, FIG. 16-A) and transmits line status information of the line made busy by the answering and inclusive of the the lane code of this line (1624, FIG. 16-A).

When the terminal 2 confirms the reception of the line status information (1624, FIG. 1B-A) from the exchange equipment 1, it checks whether the line corresponding to the line code (11B, FIG. 11) contained in the line status information is accommodated in its own button (162B, FIG. 16-B). If the line is accommodated, the line lamp corresponding to the button is turned on to indicate that the line has become busy (1627, FIG. 16-B). If it is not accommodated, it checks whether the line was a subject of the incoming call or holding display processing (1628, FIG. 1B-B). If the line is not a subject of processing, it nullifies the line status information (1624, FIG. 16-A) and does not execute any subsequent processing. If the line is a subject of processing, the line name displayed on the liquid crystal display 2-6 is deleted (1629, FIG. 16-B) and determines and turns off the lamp (i.e., either lamp A, B, C and H) having been displaying an incoming call or a held line (1630, FIG. 16-A). If there are other incoming calls held lines, the incoming call display or held line display is continued.

The above line status information reception processing will be described in greater detail with reference to the flow charts of FIGS. 17-A and 17-B, terminal tables shown in FIGS. 8 to 10 and display processing transactions shown in FIGS. 18 and 19.

Referring to FIGS. 17-A and 17-B, when the terminal 2 receives the line status information from the exchange equipment 1, it extracts the line code from the line status information (step 1701) and checks whether the corresponding line is accommodated in its own button (step 702). If the line is accommodated in itself, it checks the status kind contained in the line status information (step 1703). If the status is "busy", it turns on the line lamp corresponding to the button determined from the button table shown in FIG. 10 (step 1705) and ends the processing. If it is found in the step 1702 that the corresponding line is accommodated in none of its own buttons, it extracts the number of the group, to which the line belongs, with reference to the line table shown in FIG. 9 (step 1708) and then checks the kind of the line (step 1709). If it is found as a result of the check that the line is a central office line, it extracts the CL memory of the corresponding group with reference to the subject-of-processing line kind table shown in FIG. 8 (step 1710). If the line is a hot line, it extracts the HL memory (step 1711). If the line is a branch line, it extracts the SL memory (step 1712).

Then, it checks the status kind (112, FIG. 11) contained in the line status information (1624, FIG. 16-A). If the status is "busy", it checks the bit H (step 1728) through the check route (steps 1722, 1724 and 1726) of either bit A, B or C extracted in the step 1710, 1711 or 1712. If the checked bit is "1", it executes the line name deletion processing with respect to the held line list H (step 1729). This operation of the line name deletion processing is the same as the operation of deleting the line name through retrieval of the incoming call line list A cue pointer as noted before.

With the above operation, the speech handset 2-5 of the terminal 2 becomes busy with the answered line (1631, FIG. 16-B).

When disconnecting the busy line after communication, the operator of the terminal 2 depresses the button "disconnect" 2-8 (1632, FIG. 16-B). As a result, the call control processor 2-11 detects this (1633, FIG. 16B) and transmits the disconnection information to the exchange equipment 1 (1634, FIG. 16-B). When the exchange equipment 1 receives the disconnection information (1635, FIG. 16-B), it executes a processing of disconnecting the line busy with the terminal 2 (1638, FIG. 16-B). Then, the exchange equipment 1 transmits line status information of the line which is disconnected and now idle and inclusive of the code of this line (1637, FIG. 16-B).

When the terminal 2 recognizes the reception of the line status information from the exchange equipment 1 (1637, FIG. 16-B), it checks whether the line corresponding to the line code (113, FIG. 11) is contained in the line status information is accommodated in its own button (1639, FIG. 16-B). If the line is accommodated, it turns off the line lamp corresponding to the button to indicate that the line has become idle (1640, FIG. 16-B). If the line is not accommodated, it checks that the line was a subject of the incoming call or held line display processing (1641, FIG. 166). If the line is not a subject of processing, it nullifies the line status information (1637, FIG. 16-B) and does not execute any subsequent processing. If the line is a subject of processing, it deletes the line name which has been displayed on the liquid crystal display 2-6 (1642, FIG. 16-B) and determines and turns off the lamp (i.e., either lamp A, B, C and H) having been displaying an incoming call or a held line (1643, FIG. 16-B). If there are other incoming calls or held lines, the incoming call processing or held line processing is continued.

The above line status information reception processing will be described in greater detail with reference to the flow charts of FIGS. 17-A and 17-B, terminal tables of FIGS. 8 to 10 and display processing transactions shown in FIGS. 18 and 19.

Referring to FIGS. 17-A and 17-B, when the terminal 2 receives the line status information from the exchange equipment 1, it extracts the line code from the line status information (step 1701) and checks whether the corresponding line is accommodated in its own button through retrieval of the button table shown in FIG. 10 (step 1702). If the line is accommodated in itself, it checks the status kind contained in the line status information (112, FIG. 11) (step 1703). If the status is "idle", it turns off the line lamp corresponding to the button determined from the button table shown in FIG. 10 (step 1704) and ends the processing. If it is found in the step 1702 that the corresponding line is not accommodated in its own button, it executes steps 1708 and 1709, one of the steps 1710 to 1712 and step 1713 and then: executes the processing of the steps 1722 through 1729 as in the case when the status kind is "busy", thus effecting the line name deletion processing. The detailed operation of this line name deletion processing is the same as when the status kind is "busy", so its description is not given.

With the above operation, the speech handset 2-5 of the terminal and line which have been busy with each other are disconnected from each other to be ready for the next control, i.e., operation of answering an incoming call, placing an outgoing call and so forth.

The processing as described above permits the operator of the terminal 2 to select a given line while watching the line name displayed on the liquid crystal display or plasma display 2-6'. Further, with the registration of the subject-of-processing line kind table shown in FIG. 8 it is possible to reduce necessary lines, and therefore the display space, as shown in FIG. 3 or 6, is substantially the same as in the prior art.

Meanwhile, when the central controller 1-4 of the exchange equipment 1 detects a line status change, it need only send out the same information to all the terminals, and the repetition of such a simple processing does not substantially have an adverse effect on the processing capacity of the central processor 1-4.

Further, in a telephone exchange system accommodating several thousand lines it is usual to provide dispersed function processors around a central processor, and in this case the central controller instructs a plurality of peripheral processors, for instance processor (MPU) 1-3-1 shown in FIG. 5, to execute the same processing. Therefore, the processing capacity of the central controller in the exchange equipment is hardly adversely affected.

Conclusion

In the foregoing, the display section of the embodiment of the invention has been described as the example shown in FIG. 21, in which the terminal 2 is provided with the buttons 2-3-1 to 2-3-4, lamps 2-4-1 to 2-4-4 and liquid crystal display 2-6 as well as the dial key set for answering the information displayed on the liquid crystal display 2-6, and also the example shown in FIG. 22, which uses the plasma display 2-6' for character display for answering with position information obtained from the touch sensor 2-6' integrated on the surface. However, a further readily conceivable example is shown in FIG. 23, in which individual line lists are displayed on a CRT for answering with the button number designated with a light pen.

Figure 24:
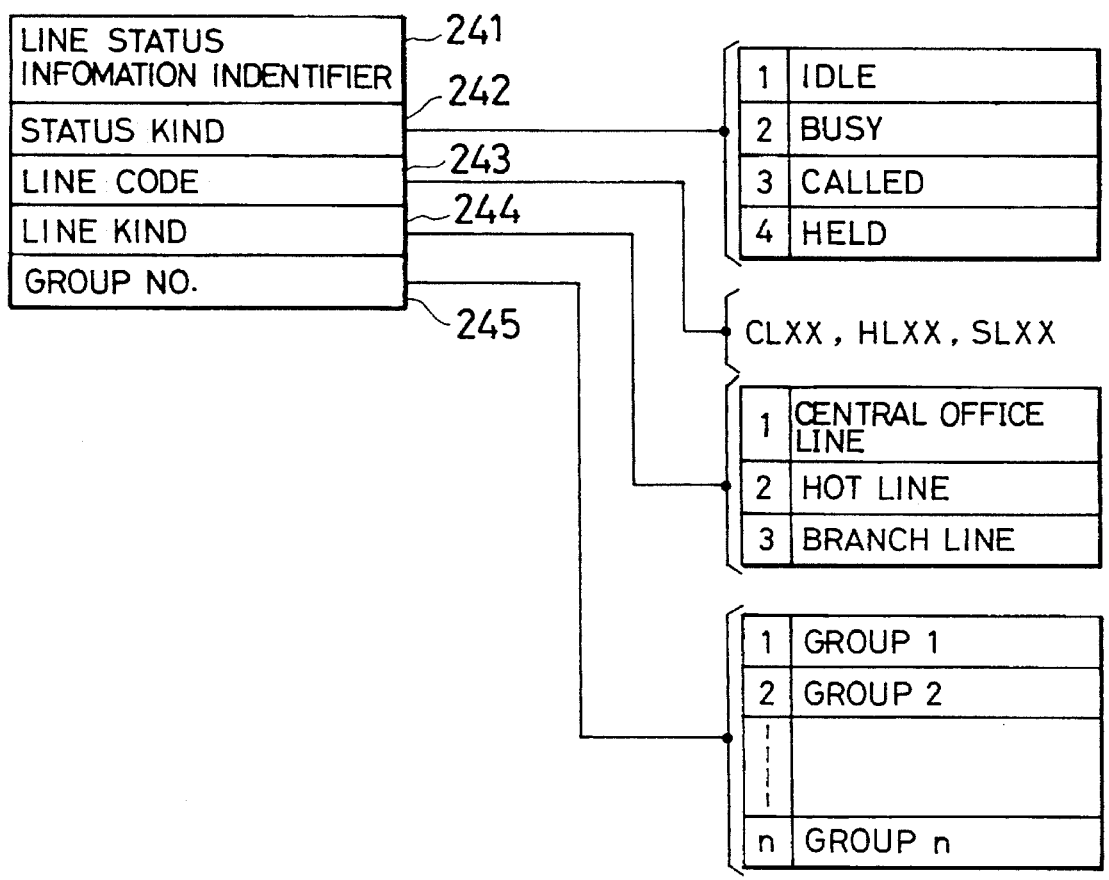
FIG. 24 is a view showing a different structure of the call control message having line status information.

Further, while this embodiment has been described using the line status information shown in FIG. 11, by permitting the line kinds and line groups to be stored and controlled on the side of the exchange equipment for sending out these data along with the line status information to the individual terminals as shown in FIG. 24, the memory contents of the table shown in FIG. 9 become partly unnecessary, thus permitting reduction of the capacity of the temporary memory (RAM) 2-13 in each terminal.

As for further applications of the invention, by adding a list showing the line names of idle lines it is possible to permit placing an outgoing call on a desired line while watching the line name, and by adding a list showing the line names busy lines it is possible to permit interruption to a desired line while watching the line name.

Lastly, the contents of the above description of the embodiment are only exemplary and by no means limitative. That is, the scope of the invention is shown in the claims and never limited by the contents of the description of the embodiment. Further, modifications equivalent to the claims are all within the scope of the invention.

Field of the Industrial Utilization

Thus, the invention can be utilized for a telephone exchange system, particularly a dealing speech system, in which a large number of lines in different kinds are accommodated in groups.

We claim:

1. A line status display system for a telephone exchange system, comprising:

an exchange apparatus containing a plurality of lines; and a plurality of terminals respectively connected to said exchange apparatus, said terminals displaying and controlling said line status in association with said exchange apparatus, wherein said exchange apparatus includes control means for simultaneously informing all of said terminals of line status information including status of said lines and line identification information for identifying said lines, wherein each of said terminals include, a memory for storing a line status display table for controlling the line identification information relating to a line which is responsive to a one-touch manual operation in said plurality of lines contained in said exchange apparatus, and for storing the line identification information relating to a line which is responsive to an operation other than said one-touch manual operation in said plurality of lines contained in said exchange apparatus, a first status display means provided corresponding to the line which is responsive to said one-touch manual operation, a second status display means provided corresponding to the line which is responsive to said operation other than said one-touch manual operation, a recognition means for referring to the line identification information of said line status information informed from control means of said exchange apparatus on the basis of said line status display table when said line status information is informed from said control means of said exchange apparatus, and for recognizing whether a line corresponding to the referred line status information is responsive to said one-touch manual operation, or whether the line corresponding to the referred line status information is responsive to said operation other than said one-touch manual operation; and a display control means for displaying and controlling the status of the line corresponding to the line status information on the first status display means when said recognition means recognizes that the line is responsive to said one-touch manual operation, and for displaying and controlling the status of the line corresponding to said line status information on the second status display means when said recognition means recognizes that the line is responsive to said operation other than said one-touch manual operation.

2. The line status display system for a telephone exchange system according to claim 1, wherein the status of the line included in said line status information is one of a void, incoming call, answering, or holding status.

3. The line status display system for a telephone exchange system according to claim 2, wherein said each of said terminals further comprises:

a third status display means for displaying that a line responsive to said operation other than said one-touch manual operation is in said holding status, and means for displaying and controlling the status of the line corresponding to the line status information of said holding status on the third status display means when the line status of line status information is in said holding status and a line corresponding to said line status information is responsive to said operation other than said one-touch manual operation.

4. The line status display system for a telephone exchange system according to claim 2, wherein said each of said terminals includes:

display means for displaying character information, means for changing line identification information related to a line responsive to said operation other than said one-touch manual operation to character information, and means for list-displaying character information corresponding to the line identification information on said display means in order to list-display character information corresponding to a line in said holding status with other lines related to said operation other than said one-touch manual operation based on an order of when lines are placed into said holding status.

5. The line status display system for a telephone exchange system according to claim 4, wherein said each of said terminals further includes means for deleting character information corresponding to the line responsive to said operation other than said one-touch manual operation when the line status information of the line related to said operation other than said one-touch manual operation is in said answering status and the display means displays the status of the line as said holding status.

6. The line status display system for a telephone exchange system according to claim 1, wherein said each of said terminals comprise:

display means for displaying character information;

means for changing line identification information related to a line responsive to said operation other than said one-touch manual operation to character information; and means for list-displaying character information corresponding to said line identification information on said display means.

7. The line status display system for a telephone exchange system according to claim 1, wherein said each of said terminals comprise:

display means for displaying character information;

means for changing line identification information related to a line responsive to said operation other than said one-touch manual operation to character information; and means for list-displaying character information corresponding to said line identification information on said display means in order to list-display character information corresponding to a line of an incoming call with other lines related to said operation other than said one-touch manual operation based on an order of incoming calls.

8. The line status display system for a telephone exchange system according to claim 7, wherein said each of said terminals have answering means for selecting a line of an incoming call displayed on said display means and answering the line of said incoming call.

9. The line status display system for a telephone exchange system according to claim 7, wherein said each of said terminals further includes means for deleting character information corresponding to the line responsive to said operation other than said one-touch manual operation when the line status information of the line related to said operation other than said one-touch manual operation is in said answering status and the display means displays the status of the line as said incoming call status.

* * * * *